US011279280B2

(12) United States Patent
Neiswander et al.

(10) Patent No.: US 11,279,280 B2
(45) Date of Patent: *Mar. 22, 2022

(54) AUTOMATED PACING OF VEHICLE OPERATOR CONTENT INTERACTION

(71) Applicant: Google LLC, Mountain View, CA (US)

(72) Inventors: Gregory Neiswander, Sunnyvale, CA (US); Sabrina Silk Billinghurst, Mountain View, CA (US); Yuan Hang Li, Milpitas, CA (US); Daniel Holle, San Francisco, CA (US); Yan Yan, Cupertino, CA (US); Jorge Taketoshi Furuya Mariche, Cupertino, CA (US); Jia Wei Tam, Seattle, WA (US); Stefan Day Dierauf, Kirkland, WA (US); Rasekh Rifaat, Kirkland, WA (US); Ian Douglas Barlow, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,398

(22) Filed: Nov. 9, 2020

(65) Prior Publication Data

US 2021/0070221 A1 Mar. 11, 2021

Related U.S. Application Data

(63) Continuation of application No. 16/680,167, filed on Nov. 11, 2019, now Pat. No. 10,829,041, which is a (Continued)

(51) Int. Cl.
*B60Q 9/00* (2006.01)
*G06F 3/0488* (2022.01)
(Continued)

(52) U.S. Cl.
CPC .............. *B60Q 9/008* (2013.01); *B60K 37/06* (2013.01); *B60W 40/09* (2013.01);
(Continued)

(58) Field of Classification Search
CPC ....... B60Q 9/008; B60K 37/06; B60W 40/09; G06F 3/0488
(Continued)

(56) References Cited

U.S. PATENT DOCUMENTS 9,165,463 B2 * 10/2015 Paek .................... B60W 40/08
10,471,896 B2 11/2019 Neiswander et al.
(Continued)

FOREIGN PATENT DOCUMENTS

| DE | 102011084887 A1 | 4/2013 |
| WO | 2013011354 A1 | 1/2013 |
| WO | 2016108207 A1 | 7/2016 |

OTHER PUBLICATIONS

International Preliminary Report on Patentability from International Application No. PCT/2017/053482, dated May 2, 2019, 17 pp.
(Continued)

*Primary Examiner* — Omar Casillashernandez
(74) *Attorney, Agent, or Firm* — Shumaker & Sieffert, P.A.

(57) ABSTRACT

In one example, a computing device includes one or more user input detection components, and one or more processors configured to receive an indication of a first user input detected by the one or more user input detection components, responsive to receiving the indication of the first user input, adjust a level of an attention buffer at a defined rate; responsive to determining that the level of the attention buffer satisfies a first threshold, prevent further interaction with a user interface of the computing device, responsive to determining that an indication of a second user input has not
(Continued)

been received within a time period, adjust a level of the attention buffer, and responsive to determining that the level of the attention buffer satisfies a second threshold, allow further interaction with the user interface.

20 Claims, 7 Drawing Sheets

Related U.S. Application Data continuation of application No. 15/693,560, filed on Sep. 1, 2017, now Pat. No. 10,471,896.

(60) Provisional application No. 62/410,713, filed on Oct. 20, 2016.

(51) Int. Cl.
*B60W 40/09* (2012.01)
*B60K 37/06* (2006.01)
*G06F 3/0481* (2022.01)
*G06F 3/04883* (2022.01)
*G06F 3/16* (2006.01)

(52) U.S. Cl.
CPC .... *G06F 3/0488* (2013.01); *B60K 2370/1438* (2019.05); *B60K 2370/193* (2019.05); *B60K 2370/195* (2019.05); *B60K 2370/197* (2019.05); *G06F 3/0481* (2013.01); *G06F 3/04883* (2013.01); *G06F 3/167* (2013.01)

(58) Field of Classification Search
USPC ........................................................ 340/439
See application file for complete search history.

(56) References Cited

U.S. PATENT DOCUMENTS

| | | |
|---|---|---|
| 10,525,984 B2 | 1/2020 | Seppelt et al. |
| 10,829,041 B2 | 11/2020 | Neiswander et al. |
| 2007/0124027 A1* | 5/2007 | Betzitza ................ B60W 40/02 701/1 |
| 2010/0332613 A1* | 12/2010 | Brakensiek ............. G06F 9/452 709/217 |
| 2011/0185390 A1* | 7/2011 | Faenger ............. G01C 21/3688 725/75 |
| 2015/0091740 A1* | 4/2015 | Bai ........................ B60Q 9/008 340/901 |
| 2018/0053103 A1 | 2/2018 | Delgado et al. |
| 2018/0111552 A1 | 4/2018 | Neiswander et al. |

OTHER PUBLICATIONS

International Search Report and Written Opinion of International Application No. PCT/US2017/053482, dated Dec. 13, 2017, 22 pp.
Response to Written Opinion dated Dec. 13, 2017, from International Application No. PCT/US2017/053482, filed Mar. 7, 2018, 12 pp.
Second Written Opinion from International Application No. PCT/US2017/053482, dated Sep. 19, 2018, 12 pp.
Prosecution History from U.S. Appl. No. 15/693,560, dated Nov. 15, 2018 through Oct. 1, 2019, 90 pp.
Prosecution History from U.S. Appl. No. 16/680,167 dated Nov. 26, 2019 through Aug. 18, 2020, 18 pgs.

* cited by examiner

AUTOMATED PACING OF VEHICLE OPERATOR CONTENT INTERACTION

RELATED APPLICATIONS

This application is a continuation of U.S. application Ser. No. 16/680,167, filed Nov. 11, 2019, which is a continuation of U.S. application Ser. No. 15/693,560, filed Sep. 1, 2017 (now U.S. Pat. No. 10,471,896), which claims the benefit of U.S. Provisional Application No. 62/410,713, filed Oct. 20, 2016, the entire contents of each of which are hereby incorporated by reference.

BACKGROUND

Operating a vehicle, such as an automobile, motorcycle, aircraft, marine craft, and the like, requires attention from the vehicle operator. Safe driving requires high levels of situational awareness of the driving task and of influences on the driving task. To maintain a high level of situational awareness for driving, the operator should pay attention to the road and be actively thinking about the driving task. When an operator engages in a secondary task, the operator may divert one or more of their eyes, hands, and mind away from the primary driving task. Diverting attention from the primary driving task too long may result in dangerous driving behavior, and potentially cause a vehicle accident.

SUMMARY

In one example, a method for pacing content interaction of a vehicle operator includes receiving, by one or more processors of a computing device, an indication of a first user input; responsive to receiving the indication of the first user input, adjusting, by the one or more processors, a level of an attention buffer at a defined rate; responsive to determining that the level of the attention buffer satisfies a first threshold, preventing, by the one or more processors, further interaction with a user interface of the computing device; responsive to determining that an indication of a second user input has not been received within a time period, adjusting, by the one or more processors, a level of the attention buffer; and responsive to determining, by the one or more processors, that the level of the attention buffer satisfies a second threshold, allowing further interaction with the user interface.

In another example, a computing device includes one or more user input detection components; and one or more processors configured to: receive an indication of a first user input detected by the one or more user input detection components; responsive to receiving the indication of the first user input, adjust a level of an attention buffer at a defined rate; responsive to determining that the level of the attention buffer satisfies a first threshold, prevent further interaction with a user interface of the computing device; responsive to determining that an indication of a second user input has not been received within a time period, adjust a level of the attention buffer; and responsive to determining that the level of the attention buffer satisfies a second threshold, allow further interaction with the user interface.

In another example, a computer-readable storage medium stores instructions that, when executed, cause one or more processors of a computing device to: receive an indication of a first user input detected by the one or more user input detection components; responsive to receiving the indication of the first user input, adjust a level of an attention buffer at a defined rate; responsive to determining that the level of the attention buffer satisfies a first threshold, prevent further interaction with a user interface of the computing device; responsive to determining that an indication of a second user input has not been received within a time period, adjust a level of the attention buffer; and responsive to determining that the level of the attention buffer satisfies a second threshold, allow further interaction with the user interface.

In another example, a computing device includes means for receiving an indication of a first user input; responsive to receiving the indication of the first user input, adjusting, by the one or more processors, a level of an attention buffer at a defined rate; responsive to determining that the level of the attention buffer satisfies a first threshold, preventing, by the one or more processors, further interaction with a user interface of the computing device; responsive to determining that an indication of a second user input has not been received within a time period, adjusting, by the one or more processors, a level of the attention buffer; and responsive to determining, by the one or more processors, that the level of the attention buffer satisfies a second threshold, allowing further interaction with the user interface.

In one example, a method for pacing content interaction of a vehicle operator includes receiving, by one or more processors of a computing device, an indication of a first user input; responsive to receiving the indication of the first user input, adjusting, by the one or more processors, a level of an attention buffer at a defined rate; responsive to determining that the level of the attention buffer satisfies a first threshold, outputting, by the one or more processors, a first notification to discourage interaction with a user interface of the computing device; responsive to determining that an indication of a second user input has not been received within a time period, adjusting, by the one or more processors, a level of the attention buffer; and responsive to determining, by the one or more processors, that the level of the attention buffer satisfies a second threshold, allowing further interaction with the user interface without outputting a subsequent notification to discourage interaction with the user interface.

In a further example, a computing device includes: one or more user input detection components; and one or more processors configured to: receive an indication of a first user input; responsive to receiving the indication of the first user input, adjust a level of an attention buffer at a defined rate; responsive to determining that the level of the attention buffer satisfies a first threshold, output a first notification to discourage interaction with a user interface of the computing device; responsive to determining that an indication of a second user input has not been received within a time period, adjust a level of the attention buffer; and responsive to determining that the level of the attention buffer satisfies a second threshold, allow further interaction with the user interface without outputting a subsequent notification to discourage interaction with the user interface.

The techniques of this disclosure may provide one or more advantages. For example, by adjusting (e.g., reducing or increasing) the attention buffer level based on detected user inputs, the techniques of this disclosure may avoid a need for additional device infrastructure for monitoring the vehicle operator's visual glance behavior to predict situational awareness and attention. For example, the techniques of this disclosure may avoid the need for additional equipment to measure the driver (e.g., eye-tracking or physiological measurement equipment). The techniques of this disclosure may further conserve computing resources of the computing device, such as by avoiding a need for additional processing resources for processing visual glance behavior monitoring data. Instead, the techniques described herein may make more efficient use of one or more types of data already collected by the computing device, such as indications of user inputs, vehicle state, or information being presented to the vehicle operator, for example.

The details of one or more examples of the disclosure are set forth in the accompanying drawings and the description below. Other features, objects, and advantages will be apparent from the description and drawings, and from the claims.

DETAILED DESCRIPTION

Figure 1:
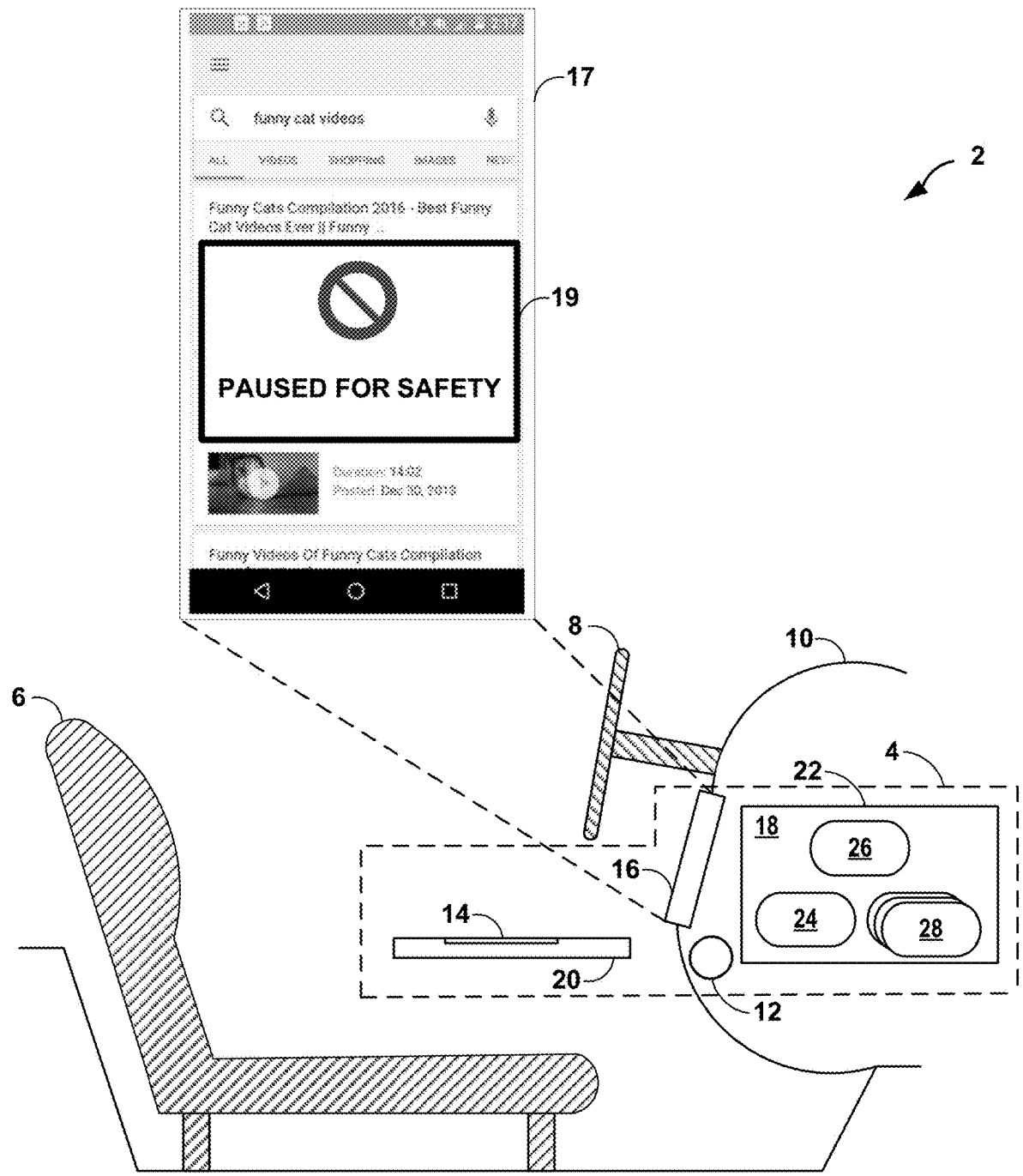
FIG. 1 is a conceptual diagram illustrating an interior of a vehicle that includes a computing system configured to pace content interaction by an operator of the vehicle, in accordance with one or more techniques of this disclosure.

In general, this disclosure is directed to techniques for enabling computing systems to pace content interaction by vehicle operators. If a computing system detects that an operator is interacting with the user interface in a manner that indicates insufficient attention is being given to a driving task, the computing system may block interaction with a user interface. The computing system keeps track of how much the operator is interacting with the user interface, and allows interaction with the user interface to resume after the operator has reduced interaction with the user interface. The techniques may aid in managing an attention level of the vehicle operator directed towards the driving task, thereby avoiding unsafe distraction during driving.

In some examples, a computing device may employ a buffer model that determines how much a user can interact with a car infotainment system. The computing device may use the buffer model to determine an allowable extent of interaction by the user with an infotainment system inside a vehicle, e.g., based on the user's tapping behavior and/or an amount of information present to the user after an input. The computing device may deplete the buffer at a defined rate as the user interacts and restore the buffer over time when no interaction is detected. The computing device may suspend the user's ability to input to the infotainment system for a certain amount of time when the buffer is depleted, before further interaction is permitted. The computing device may adjust the buffer level responsive to different inputs, depending on several factors including type of input, data displayed to the driver, and driving state of the vehicle.

Throughout the disclosure, examples are described where an in-vehicle computing system, computing device and/or a computing system analyzes information (e.g., context, locations, speeds, tap interactions, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIG. 1 is a conceptual diagram illustrating an interior of a vehicle that includes a computing system configured to pace content interaction by an operator of the vehicle, in accordance with one or more techniques of this disclosure. As illustrated in FIG. 1, vehicle 2 includes vehicle computing system 4, seat 6, steering wheel 8, and dashboard 10. Vehicle computing system 4 is configured to block interaction with a user interface in response to detecting that the operator is interacting with the user interface in a manner that indicates insufficient attention is likely being given to the driving task, and allow interaction with the user interface in response to detecting that the operator is interacting with the user interface in a manner that indicates sufficient attention is likely being given to the driving task.

As illustrated in FIG. 1, vehicle 2 may be an automobile, but aspects of the present disclosure may also be applicable to other types of vehicles, including trucks, motorcycles, aircraft, watercraft, trains, bicycles, or other vehicles. A driver may normally occupy seat 6, which may be positioned directly behind steering wheel 8 of vehicle 2 such that an occupant of seat 6 may physically control steering wheel 8. Steering wheel 8 may protrude from dashboard 10. At least one front passenger seat may be laterally positioned adjacent to seat 6. Other passenger seats may be positioned behind seat 6 or in front of seat 6.

A collection of devices, components, and modules that may each be included in vehicle computing system 4 is also shown in FIG. 1. Vehicle computing system 4 includes, but is not limited to, presence-sensitive panel 14, display 16 and control unit 18. One or more components of vehicle computing system 4, such as presence-sensitive panel 14 may be directly and physically accessible to occupants seated in the front driver and front passenger seats of vehicle 2, and may be located within, near, or on center console 20. Such components may be within easy reach of such occupants, and may also or alternatively be positioned in another passenger area of vehicle 2, such as a back seat. As further described below, presence-sensitive panel 14 may function as an input device for vehicle computing system 4. In some examples, presence-sensitive panel 14 may be integrated into display 16 such that display 16 may be a presence-sensitive display. In some examples, one or more components of vehicle computing system 4 that may not necessarily require physical access by occupants of vehicle 2 (such as, in some examples, speakers 12, display 16, and control unit 18), may be positioned in or on or integrated into dashboard 10.

In some examples, as shown in FIG. 1, some or all of vehicle computing system 4 may be housed within dashboard 10, which may in some examples be constructed of plastic, vinyl, leather, rubber, aluminum, steel, or any other suitable material. Control unit 18 may be housed within housing 22, which may also be constructed of plastic, vinyl, rubber, aluminum, steel, or any other suitable material. In some examples, housing 22 may also be a rigid case that encloses and otherwise protects one or more electrical components that provide functionality for vehicle computing system 4. In some examples, housing 22 may be affixed, mounted or otherwise integrated with the automobile dashboard or console.

Although described for purposes of example as a component or system installed in vehicle 2, in some examples, some or all aspects described with respect to vehicle computing system 4 may be housed within a computing device separate from vehicle 2, such as a mobile computing device. For instance, the mobile computing device may be a mobile computing device (e.g., a smart phone) of an operator of the vehicle. In some examples, the computing device may be held by the operator or mounted to dashboard 10 or other portion of vehicle 2 (e.g., removably mounted). The computing device may, in some examples, plug into vehicle 2 or connect to vehicle computing system 4 by a cable. In some examples, the computing device may cast or project an operating system interface to the display 16 of vehicle computing system 4, such that an operator interacts with display 16 of vehicle computing system 4 to view or interact with content provided by the computing device (e.g., as described with respect to FIG. 3). For example, the computing device may use a head up display in which information is projected to a transparent screen and a driver can view the information while also seeing through the transparent screen to the roadway).

The computing device may allow the operator to control the computing device and/or applications executing on the computing device, such as controlling via one or more of a presence-sensitive display of vehicle computing system 4 and voice commands. In some examples, aspects described herein as being displayed via display 16 may alternatively or additionally be displayed by a display of the mobile computing device. In some examples, inputs that may be described herein as being received via presence-sensitive panel 14 may be alternatively or additionally received by a presence-sensitive display of the mobile computing device. In some examples, inputs may be received via presence sensitive-panel 14 and the inputs control operation of the mobile computing device, which displays information in response to the inputs on a display of the mobile computing device and/or a display 16 of an in-vehicle computing system.

Figure 2:
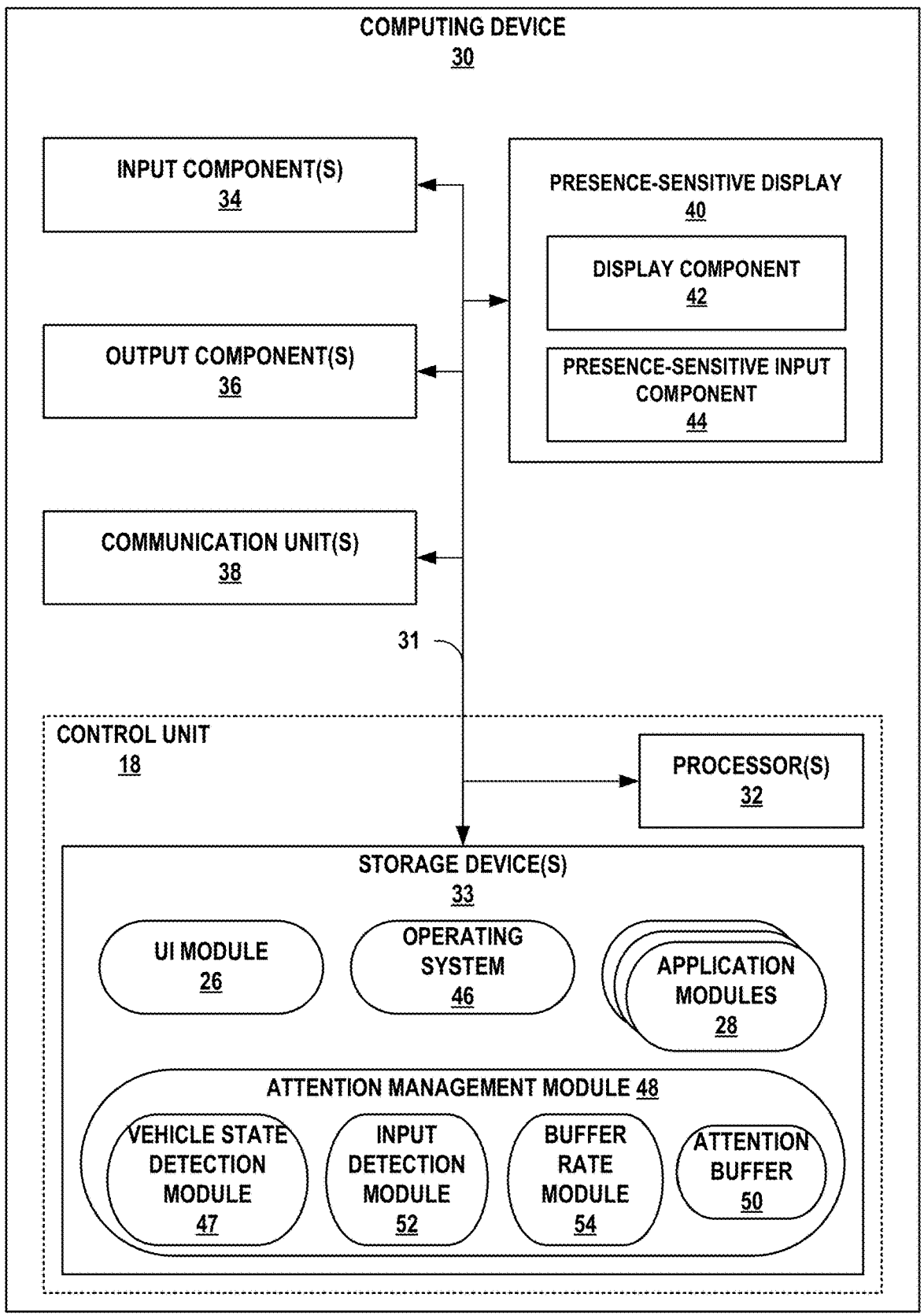
FIG. 2 is a block diagram illustrating an example vehicle computing device configured to pace content interaction by a vehicle operator, in accordance with one or more techniques of this disclosure.

Control unit 18 may provide an operating environment or platform for one or more modules, such as a combination of hardware, firmware, and software, as further illustrated in FIG. 2. For instance, control unit 18 may include one or more processors and storage devices that may execute instructions and store data of one or more modules. Control unit 18 may also be operably coupled to one or more other software and/or hardware components, including presence-sensitive panel 14, and display 16 to control, configure, and/or communicate information with the components, to name only a few example operations.

Vehicle computing system 4 may operate to assist, inform, entertain, or perform other tasks that require user interactions with occupants of a vehicle. Vehicle computing system 4 may be referred to as an in-vehicle infotainment (IVI) system, or a subcomponent thereof. For example, vehicle computing system 4 may include one or more application modules 4 that perform functions or process information on behalf of one or more occupants of vehicle 2. For instance, vehicle computing system 4 may provide a navigation service that provides directions to destinations. Vehicle computing system 4 may also provide an information retrieval service that provides information in response to queries and/or as preemptive assistance or recommendations. Vehicle computing system 4 may also provide vehicle data about vehicle 2, or multimedia such as audio or video. Only a few examples are mentioned of the functionality that may be provided by vehicle computing system 4, and vehicle computing system 4 may provide many additional capabilities. In this and other ways, vehicle computing system 4 may improve the driving or riding experience for one or more occupants of vehicle 2.

In some examples, vehicle computing system 4 may be controlled through input detected by presence-sensitive panel 14, and/or through input detected by one or more additional input devices (e.g., microphones, cameras, physical buttons or switches, or other types of input devices). Presence-sensitive panel 14 may, in some examples, function simply as an input device for touch input, provided by user input that occurs directly and physically at presence-sensitive panel 14. For instance, presence-sensitive panel 14 may function as a presence-sensitive input device using a presence-sensitive device, such as a resistive touchscreen or touch panel, a surface acoustic wave touchscreen or touch panel, a capacitive touchscreen or touch panel, a projective capacitance touchscreen or touch panel, a pressure-sensitive screen or touch panel, an acoustic pulse recognition touchscreen or touch panel, or another presence-sensitive screen or touch panel technology.

Display 16 may function as an output device, such as a display device, using any one or more of a liquid crystal display (LCD), dot matrix display, light emitting diode (LED) display, organic light-emitting diode (OLED) display, e-ink, or similar monochrome or color display capable of outputting visible information to a user or vehicle occupant. In some examples, display 16 may also function as an input device, so that it serves as both an input and output device. In such examples, display 16 may include an integrated presence-sensitive input device (e.g., presence-sensitive panel 14 may be integrated into display 16) and a display device. For instance, display 16 may function as a presence-sensitive input device using a presence-sensitive screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. Based on user input, display 16 may present output to a user. For instance, display 16 may present various user interfaces of applications (e.g., a navigation application, a music application, a vehicle control application, a telephony application, a messaging application, a search application, etc.) executing at vehicle computing system 4. An occupant of the vehicle, such as a driver, may provide user input to interact with one or more of such applications.

As described above, vehicle computing system 4 may include attention management module 24, user interface (UI) module 26, and application modules 28. Attention management module 24, UI module 26, and application modules 28 may perform operations described herein using software, hardware, firmware, or a mixture of both hardware, software, and firmware residing in and executing by vehicle computing system 4 or at one or more other remote computing devices. As such, attention management module 24, UI module 26, and application modules 28 may be implemented as hardware, software, and/or a combination of hardware and software. Vehicle computing system 4 may execute attention management module 24, UI module 26, application modules 28, or one or more other modules as or within a virtual machine executing on underlying hardware. Attention management module 24, UI module 26, and application modules 28 may be implemented in various ways. For example, attention management module 24, UI module 26, and application modules 28 may be implemented as a downloadable or pre-installed application or "app." In another example, attention management module 24, UI module 26, and application modules 28 may be implemented as part of an operating system of vehicle computing system 4.

Application modules 28 may include functionality to perform any variety of operations on vehicle computing system 4. For instance, application modules 28 may include one or more of a navigation application, a weather application, a phone dialer application, an information retrieval application, a multimedia application, a vehicle information application, an email application, a text messaging application, an instant messaging application, a social networking application, a stock market application, an emergency alert application, a sports application, to name only a few examples. Although shown as operable within control unit 18 of vehicle computing system 4, one or more of application modules 28 may be operable by a remote computing device that is communicatively coupled to vehicle computing system 4. In such examples, an application module executing at a remote computing device may cause the remote computing device to send content and intent information using any suitable form of data communication (e.g., wired or wireless network, short-range wireless communication such as Near Field Communication or Bluetooth, etc.). In some examples, a remote computing device may be a computing device that is separate from a computing device included in vehicle computing system 4. For instance, the remote computing device may be operatively coupled to vehicle computing system 4 by a network. The remote computing device may be operatively coupled to vehicle computing system 4 by a wired connection, such as USB, Thunderbolt, or Lightning cables, for example. Examples of a remote computing device may include, but is not limited to a server, smartphone, tablet computing device, smart watch, and desktop computer. In some examples, a remote computing device may or may not be an integrated component of vehicle computing system 4.

UI module 26 of vehicle computing system 4 may receive, from presence-sensitive panel 14, one or more indications of user input detected at presence-sensitive panel 14. Generally, each time presence-sensitive panel 14 detects user input at a particular location of presence-sensitive panel 14, UI module 26 may receive an indication of user input or information about the user input from presence-sensitive panel 14. UI module 26 may assemble the information received from presence-sensitive panel 14 into a set of one or more events, such as a sequence of one or more touch events. Each touch event in the sequence may include data or components that represent parameters (e.g., when, where, originating direction) characterizing a presence and/or movement of input at presence-sensitive panel 14. Each touch event in the sequence may include a location component corresponding to a location of presence-sensitive panel 14, a time component related to when presence-sensitive panel 14 detected user input at the location, and/or an action component related to whether the touch event corresponds to a lift up or a push down at the location.

UI module 26 may determine one or more characteristics of the user input based on the sequence of touch events and include information about these one or more characteristics within each touch event in the sequence of touch events. For example, UI module 26 may determine one or more of a start location of the user input, an end location of the user input, a density of a portion of the user input, a speed of a portion of the user input, a direction of a portion of the user input, and a curvature of a portion of the user input. UI module 26 may transmit indications of user input from presence-sensitive panel 14 to other modules, such as application modules 28 and attention management module 24. UI module 26 may determine one or more single- or multi-touch gestures provided by a user. UI module 26 may also act as an intermediary between various components of vehicle computing system 4 to make determinations based on input detected by presence-sensitive panel 14 and generate output presented by display 16. For instance, UI module 26 may receive data from one or more application modules 28 and cause display 16 to output content, such as a graphical user interface, for display. UI module 26 may transmit indications of user input from other input components in addition or alternative to presence-sensitive panel 14, such as indications of user inputs such as voice commands detected by a microphone or non-touch gesture commands detected by a camera or other sensors.

Vehicle 2 may include a wide variety of sensors, which may be configured to provide output to vehicle computing system 4. For instance, vehicle 2 may include a speed sensor, an acceleration sensor, a position sensor, and the like. In some examples, vehicle computing system 4 may be configured to communicate with the sensors via a network or bus of vehicle 2, such as a component area network (CAN) bus.

In accordance with one or more techniques of this disclosure, vehicle computing system 4 may use an attention buffer to monitor an amount or rate of interaction with content presented by the user interface and suspends user interaction when a state of the attention buffer indicates the amount or rate of interaction exceeds expected thresholds for situationally-aware driving. The techniques of this disclosure may serve to encourage a responsible interaction level and suspend an irresponsible interaction level.

For example, the techniques of this disclosure include vehicle computing system 4 using an attention buffer model which may serve a predictor of driver awareness and attention to the driving task. The attention buffer model associates indications of user inputs with the vehicle operator paying attention to the user interface, and associates an absence of indications of user inputs with the vehicle operator paying attention to the driving task. The attention buffer may be developed to represent a capacity of mental resources and derived situational awareness that the vehicle operator has available to devote to the primary task of driving. When the attention buffer is at a maximum amount or exceeds a threshold, the level represents that the vehicle operator is assumed to have appropriate levels of driving situational awareness. When the attention buffer level drops below a threshold or reaches its minimum amount, the level represents that the vehicle operator is assumed need to regain driving situational awareness.

Vehicle computing system 4 maintains the attention buffer and may be configured, e.g., based on the attention buffer model, to deplete (e.g., decrease a level of) or restore (e.g., increase a level of) the attention buffer based on indications of user inputs. For example, vehicle computing system 4 may deplete the attention buffer in response to receiving indications of user inputs. For example, vehicle computing system 4 may fully or partially restore the attention buffer in response to determining that no indications of user inputs are received in a time period.

If vehicle computing system 4 receives indications of multiple user inputs in succession, vehicle computing system 4 may decrease the level of the attention buffer and at some point, the attention buffer will be empty or below a threshold level. In response to determining this point is reached, vehicle computing system 4 may take one or more actions that prompt the user to cease making user inputs to the user interface and return attention to the driving task. For example, vehicle computing system 4 may output a notification and/or block interaction with the user interface. The vehicle computing system 4 may allow interaction with the user interface to resume after determining the attention buffer is restored to a predetermined level. If the vehicle operator adopts a responsible interaction strategy with appropriate attentional balance between the primary driving task and the secondary user interface task, the attention buffer remains high and the operator may not be blocked from the user interface.

For example, in accordance with one or more techniques of this disclosure, vehicle computer system 4 includes attention management module 24, which may include functionality to manage an attention level of an operator of vehicle 2 to encourage the operator to devote a level of attention to the driving task sufficient to ensure safety. For example, attention management module 24 may be configured to receive indications of user inputs received or detected by one or more input components (including, for example, presence-sensitive panel 14) and pace the operator's content interaction by controlling, based on the user inputs, whether the input components and/or display 16 are operable by the operator. User inputs that attention management module 24 may use as a basis for determining whether to allow the user to interact with input components 34, 44 may include, for example, touch inputs, voice commands, and/or gesture commands. Touch inputs, including inputs detected by presence-sensitive input component 44, may include a tap input, a swipe input, a slow scroll input, and a fast scroll input, for example. In some examples, these touch inputs may include multi-finger gesture inputs.

User inputs may be correlated to the operator's expected visual glance behavior, and relying on user inputs may provide a more practical, less expensive option for an attention model than measuring actual glance behavior. Attention management module 24 may be configured according to an attention model as described herein, to use user inputs such as touch inputs, voice commands, and gesture commands as a surrogate for glance behavior and an overall predictor of situational awareness of the driving task. Attention management module 24 may use a buffer model to determine how much a vehicle operator (user) can interact with a user interface such as touch-sensitive panel 14, display 16, or other input components. Attention management module 24 may determine how much the user is allowed to interact with the user interface based on, for example, one or more of user input behavior or an amount of information presented to the user after user input. For example, attention management module 24 may maintain an attention buffer 50. In this example, attention management module 24 determines whether a user should interact with the user interfaces based on a state of attention buffer 50. As the user interacts with the user interface(s) of vehicle computing system 4, attention management module 24 may deplete attention buffer 50 at a defined rate. Over time, in response to detecting a lack of user inputs, attention management module 24 may restore the attention buffer, such as by applying attention buffer credits. Attention buffer 50 may have a maximum value, such that once the maximum is reached, no further attention buffer credits are applied to attention buffer 50.

The model for configuring attention management module 24 to use attention buffer 50 may be developed based on data that associates visual glance behaviors with user inputs. As more data becomes available, attention management module 24 may be configured to extend the model. For example, attention management module 24 may be refined and extended to respond differently, such as by decreasing the level of the attention buffer at different rates or by certain discrete attention buffer debit values depending on one or more factors. In some examples, attention management module 24 may dynamically determine a rate or value by which to deplete or restore attention buffer 50 based on one or more factors, such as what information is being shown to the operator (e.g., type, amount, rate), user inputs indicating what the operator is doing with that information or how the operator is consuming the information (e.g., single inputs, quick successive inputs indicating scrolling), or driving state, for example. In this manner, attention management module 24 may be configured to derive a depletion rate for attention buffer 50 that corresponds to the overall task complexity or expected level of distraction incurred.

Alternatively or in addition to deriving a depletion rate for attention buffer 50, attention management module 24 may in some examples assign a "glance value" to a detected user input, where the glance value varies based on one or more factors, such as any of the factors described in this disclosure. Other factors that attention management module 24 may use for determining a rate at which to deplete or restore attention buffer 50 or a glance value to assign to an input that affects depletion of attention buffer 50 may include an amount of content being displayed to a user, a complexity of content being displayed to a user, a pace at which a user is scrolling through displayed content, direction of scrolling (up or down), type of user interface element tapped (e.g., home button, play button), relative content menu level (e.g., sub-menu level, main menu level), whether access is being requested to view new content or to view content that was previously viewed, whether and how information is organized (e.g., alphabetical order or unordered).

For example, attention management module 24 may assign a higher glance value and/or deplete attention buffer 50 at a higher rate when more content or more complex content is being displayed to a user than when less content or simpler content is being displayed to a user. Complexity may be determined based on various factors, such as type of content (icons, text, ratio therebetween) and amount of content, for example. As another example, attention management module 24 may assign a higher glance value and/or deplete attention buffer 50 at a higher rate for inputs to scroll more slowly through displayed content than for input to scroll more quickly through displayed content. As a further example, attention management module 24 may assign a higher glance value and/or deplete attention buffer 50 at a higher rate for inputs to scroll down than inputs to scroll up.

As another example, attention management module 24 may assign a higher glance value and/or deplete attention buffer 50 at a higher rate for tapping a play button than for tapping a home button. As another example, attention management module 24 may assign a higher glance value and/or deplete attention buffer 50 at a higher rate for a tap that accesses a sub-menu level than a tap for accessing a main menu level. As another example, attention management module 24 may assign a higher glance value and/or deplete attention buffer 50 at a higher rate for a tap that requests to view new content than for a tap that requests to view content that was previously viewed. As a further example, attention management module 24 may assign a higher glance value and/or deplete attention buffer 50 at a higher rate when displayed information is unordered than when displayed information is ordered.

Attention management module 24 determining that the attention buffer is depleted may indicate the user has devoted too much attention to the interface in too short of a time window. In this case, attention management module 24 may suspend user input for a certain amount of time before permitting further interaction, until the attention buffer 50 is restored to a certain level. For example, attention management module 24 may cause UI module 26 to output for display a temporary lockout screen (e.g., via display 16). For example, UI module 26 may cause display 16 to present graphical user interface 17. Graphical user interface 17 includes graphical elements displayed at various locations of display 16. For example, as illustrated in FIG. 1, graphical user interface 17 includes a plurality of regions, including a primary application region, a controls region, and a notification region. The notification region includes notification 19, which displays a "no" icon and a message "PAUSED FOR SAFETY."

In some examples, attention management module 24 may cause UI module 26 to output for display a graphical element indicating the user must wait until user input can be resumed, such as a spinning icon, a blinking icon, or other graphical element, animation, or message. In some examples, attention management module 24 may cause UI module 26 to output for display an indication of an amount of time remaining until user input can be resumed. For example, the indication may be a graphical depiction of an hourglass or a colored or shaded bar on which the amount of color or shading increases or changes to indicate a percent of completion of the pause time.

Alternatively or additionally, attention management module 24 may cause UI module 26 to output an audible notification (e.g., an audio cue) prompting the driver to focus back on driving for a period of time (e.g., via speakers 12). In some examples, the audible notification may include a tone that is played to cue the driver to focus on the road or to indicate that browsing access is paused. Alternatively or additionally, the audible notification may include a voice education message indicating that browsing is being paused for safety. The voice education message may indicate that browsing may be resumed in a defined time period.

In some examples, attention management module 24 may delay suspending user input and outputting a notification until after a defined time period has elapsed from when the attention buffer 50 is depleted. For example, attention management module 24 may delay suspending user input for 1 second after determining that the attention buffer 50 is depleted.

In response to determining that no user inputs are received in a configured time period, attention management module 24 may increase a level of the attention buffer. Attention management module 24 may allow interaction with the user interface in response to determining that the attention buffer is restored to the appropriate level. In some examples, attention management module 24 may cause UI module 26 to output an audible notification (e.g., an audio cue) to indicate that the user is again allowed to interact with the user interface. In some examples, the audible notification may include a tone that is played to indicate that browsing access is resumed. Alternatively or additionally, the audible notification may include a voice education message indicating that browsing may be resumed. In this manner, operation of attention management module 24 may have an effect of encouraging the user refocus on the driving task for a period of time to regain situational awareness of the driving task before further interacting with the user interfaces of vehicle computing system 4. The techniques of this disclosure may help the user to appropriately shift between the primary driving task and the secondary task of interacting with the user interfaces, to ensure proper attention is given to the primary driving task and thereby maintain safe driving while engaging in the secondary task.

In some examples, pacing content browsing of the vehicle operator includes attention management module 24 determining a rate of information output for display by the computing device. Responsive to determining that the rate of information output for display is above a threshold rate, attention management module 24 reduces a level of an attention buffer stored by the computing device, and responsive to determining that the rate of information output for display is not above the threshold rate, attention management module 24 increases the level of the attention buffer. Responsive to determining that the level of the attention buffer has fallen below a first attention buffer threshold, attention management module 24 may output an indication that the vehicle operator's interaction with a user interface is suspended. Responsive to determining that the level of the attention buffer is above a second attention buffer threshold, attention management module 24 allows the vehicle operator to interact with the user interface. Although described for purposes of example in terms of in terms of reducing a level of an attention buffer as user inputs are detected and increasing the level of the attention buffer as user inputs are not detected, in other examples different models may be used. For example, an "interaction intensity" attention buffer model may be used, and attention buffer module 48 may increase a level of the interaction intensity attention buffer as user inputs are detected. When the interaction intensity attention buffer exceeds a first threshold, attention buffer module 48 may trigger notifications to discourage interaction and/or interaction may be blocked until the interaction intensity attention buffer is below a second threshold.

In some examples, attention management module 48 may use multiple, successive thresholds at which to output different notifications of increasing prominence to the user. The notifications may include one or more of audible notifications, visual notifications, tactile notifications, or a combination of these. In some examples, attention management module 24 may use progressive and adaptive visual and interaction design elements of the presentation of one or more notifications to promote returning attention to the driving task and discourage interaction with the user interface, potentially without suspending user input at all. For example, the way notifications are presented may evolve as successive attention buffer thresholds are met, such as by changing one or more of size, color, volume, amount of detail, or amount of information provided. Notifications may change to convey an increasing sense of urgency as successive attention buffer thresholds are met.

In some examples, certain functionality of attention management module 24 described herein may depend on determining a driving state of vehicle 2. For instance, attention management module 24 may initially determine whether vehicle 2 is moving before proceeding with methods described herein for pacing the vehicle operator's content interaction. If attention management module 24 determines that vehicle 2 is moving at a speed of zero or near zero, attention management module 24 may not reduce a level of an attention buffer in response to detecting user inputs.

Alternatively or additionally, attention management module 24 may select different rates for depleting the attention buffer depending on the speed of the vehicle detected. In some examples, attention management module 24 may determine a driving state and/or speed of vehicle 2 based on indications received from in-vehicle system, and/or from sensors of vehicle computing system 4 (e.g., physical wheel speed, GPS). For example, components of vehicle 2 may detect when vehicle 2 is in a "Park" setting or gear, and attention management module 24 may receive an indication of the setting/gear from the components, such as from shift components. Attention management module 24 may receive an indication of the driving state of vehicle 2 from a mobile computing device. In some examples, attention management module 24 may derive an indication of speed of the vehicle 2 based on data received from sensors of mobile computing device (e.g., GPS data) that measure speed of the mobile computing device. In some examples, vehicle computing system 4 may obtain GPS data from a mobile computing device using application programming interface (API) calls to the mobile computing device or to a central server where data from the mobile computing device sensors has been stored.

In some examples, attention management module 24 may determine how much of the display to lock the user out of interacting with, and may only lock the user out of a portion of the display. As one example, attention management module 24 may permit a user to continue to view or interact with a navigation application that the user is currently using for vehicle navigation, while preventing the user from interacting with other portions of the display. In further examples, attention management module 24 may determine particular type of interaction to lock the user out of, and may only prevent the user from interacting with the user interface in certain ways. For example, attention management module 24 may not allow a user to interact by scrolling, but may accept tap inputs. This may allow a user to complete a task before preventing further interaction with the user interface.

The techniques of this disclosure may serve to decrease a distraction level of a vehicle operator due to interacting with the user interface without simply limiting the vehicle operator to a defined number of user inputs (e.g., display a lockout screen after six taps). The techniques described herein may also have an effect of encouraging or coaching proper interaction behavior such that the vehicle operator adopts a better interaction model, resulting in fewer instances of attention management module 24 suspending the user's interaction with the user interface and a better overall user experience having more efficient interaction with the user interface. The techniques described herein may enable the user to safely interact with larger menu structures while still pacing the user appropriately to aid the driver in attending to the driving task.

In this manner, the techniques of this disclosure may avoid a need for additional device infrastructure for monitoring the operator's visual glance behavior to predict situational awareness and attention, which may be more expensive or less practical. For example, the techniques of this disclosure may avoid the need for additional equipment to be installed with vehicle computing system 4 to measure the driver (e.g., eye-tracking or physiological measurement equipment). The techniques of this disclosure may further conserve computing resources of vehicle computing system 4 by avoiding a need for additional processing resources for processing visual glance behavior monitoring data. Instead, the techniques described herein can make more efficient use of one or more types of data already collected by the computing system, such as indications of user inputs, vehicle state, or information being presented to the user, for example.

In some examples, the techniques of this disclosure may encourage and coach proper interaction behaviors for drivers. By employing techniques that may not limit the user to a fixed number of user inputs for accessing content, the techniques of this disclosure may enable use of new application structures and forms of content to be provided to the driver, thereby potentially easing software developer requirements, while providing a more responsible experience to the driver. The techniques of this disclosure could lead to improved driver interaction, thus making driving safer.

While the operations of attention management module 24 are likely to help pace content browsing actions of the operator, a reduction in distraction level cannot be guaranteed. Instead, the model for pacing content browsing by attention management module 24 may be determined to have a likelihood of reducing the operator's distraction level. For instance, attention management module 24 may determine that a particular attention buffer model has a high probability of reducing the operator's distraction level and improving the amount of attention directed to the driving task. This probability may be determined based on generalities and/or may be specific to the particular operator.

FIG. 2 is a block diagram illustrating an example vehicle computing device configured to pace content interaction by a vehicle operator, in accordance with one or more techniques of this disclosure. Computing system 30 may be, for example, a mobile computing device or wearable computing device. Examples of mobile computing device 10 may include, but are not limited to, portable devices such as mobile phones (including smart phones), laptop computers, tablet computers, cameras, personal digital assistants (PDAs), etc. In some examples, computing device 30 may be a vehicle computing system such as vehicle computing system 4 of FIG. 1. Computing system 30 is described below for purposes of example within the context of FIG. 1. FIG. 2 illustrates only one particular example of computing device 30, and many other examples of computing device 30 may be used in other instances and may include a subset of the components shown in FIG. 2 or may include additional components not shown in FIG. 2.

As shown in the example of FIG. 2, computing device 30 includes one or more input components 34, one or more output components 36, one or more communication units 38, and presence-sensitive display 40, and control unit 18 that include one or more processors 32, and one or more storage devices 33. Storage devices 33 of control unit 18 may also include operator stress module 24, UI module 26, application modules 28, and operating system 46. Communication channels 31 may interconnect one or more of the components 24, 26, 28, 32, 33, 34, 36, 38, 40, and 46 for inter-component communications (physically, communicatively, and/or operatively). In some examples, communication channels 31 may include a system bus, a network connection, one or more inter-process communication data structures, or any other components for communicating data between hardware and/or software.

As shown in FIG. 2, control unit 18 may store and execute the data and instructions of one or more applications, modules or other software. Although FIG. 2 illustrates control unit 18 as including one or more processors 218 and one or more storages device 220, control unit 18 may include more or fewer components than shown in FIG. 2. For instance, control unit 18 may include one or more output devices, input devices, input/output ports or interface, sensors and/or communication units to name only a few examples. In other examples, control unit 18 may only include one or more processors. In any case, control unit 18 may provide an operating environment for one or one more modules, such as operator stress module 24, user-interface (UI) module 26, application modules 28, and operating system 46.

One or more processors 32 may implement functionality and/or execute instructions within computing device 30. For example, processors 32 of control unit 18 may receive and execute instructions stored by storage devices 33 that provide the functionality of operator stress module 24, UI module 26, application modules 28, and operating system 46. These instructions executed by processors 32 may cause computing device 30 to store and/or modify information, within storage devices 33 during program execution. Processors 32 may execute instructions of operator stress module 24, UI module 26, application modules 28, and operating system 46 to perform one or more operations. That is, operator stress module 24, UI module 26, application modules 28, and operating system 46 may be operable by processors 32 to perform various functions described herein.

One or more input components 34 of computing device 30 may receive input. Examples of input are tactile, audio, and video input. In some examples, input components 34 may include functionality of presence-sensitive panel 14 of FIG. 1. Input components 34 of computing device 30, for example, may include one or more of a presence-sensitive input device (e.g., a touch sensitive screen or pad, a presence-sensitive display), mouse, keyboard, button, rotary-translational knob, thumbpad, d-pad, switch, voice responsive system, video camera, microphone or any other type of device for detecting input from a human or machine. In some examples, input components 34 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output devices 36 of computing device 30 may generate output. Examples of output are tactile, audio, and video output. In some examples, output components 36 may include functionality of display 16 of FIG. 1. Output devices 36 of computing device 30, in one example, include a presence-sensitive screen, sound card, video graphics adapter card, speaker, cathode ray tube (CRT) monitor, liquid crystal display (LCD), or any other type of device for generating output to a human or machine. Output devices 36 may include display devices such as cathode ray tube (CRT) monitor, liquid crystal display (LCD), Light-Emitting Diode (LED) or any other type of device for generating tactile, audio, and/or visual output.

One or more communication units 38 of computing device 30 may communicate with external devices by transmitting and/or receiving data. For example, computing device 30 may use communication units 38 to transmit and/or receive radio signals on a radio network such as a cellular radio network. In some examples, communication units 38 may transmit and/or receive satellite signals on a satellite network such as a Global Positioning System (GPS) network or a Global Navigation Satellite System (GLONASS) network. Examples of communication units 38 include a network interface card (e.g. such as an Ethernet card), an optical transceiver, a radio frequency transceiver, a GPS receiver, or any other type of device that can send and/or receive information. Other examples of communication units 38 may include Bluetooth®, GPS, 3G, 4G, and Wi-Fi® radios found in mobile devices as well as Universal Serial Bus (USB) controllers and the like.

In some examples, presence-sensitive display 40 of computing device 30 may include functionality of input components 34 and/or output components 36. In the example of FIG. 2, presence-sensitive display 40 may include a presence-sensitive input component 44, such as a presence-sensitive screen or touch-sensitive screen. In some examples, presence-sensitive input component 44 may detect an object at and/or near the presence-sensitive input device. As one example range, presence-sensitive input component 44 may detect an object, such as a finger or stylus that is within two inches or less of presence-sensitive input component 44. Presence-sensitive input component 44 may determine a location (e.g., an (x,y) coordinate) of the presence-sensitive input device at which the object was detected. In another example range, presence-sensitive input component 44 may detect an object six inches or less from presence-sensitive input component 44 and other ranges are also possible. Presence-sensitive input component 44 may determine the location of presence-sensitive input component 44 selected by a user's finger using capacitive, inductive, and/or optical recognition techniques.

In some examples, presence-sensitive display 40 may also provide output to a user using tactile, audio, or video stimuli as described with respect to output components 36. For instance, presence-sensitive display 40 may include display component 42 that presents a graphical user interface. Display component 42 may be any type of output device that provides visual output, such as described with respect to output components 36. Presence-sensitive display 40 may, in some examples, be an external component that shares a data path with other components of computing device 30 for transmitting and/or receiving input and output. For instance, presence-sensitive display 40 may be a built-in component of a head-unit (such as housing 22 of FIG. 1 that includes control unit 18), located within and physically connected to the external packaging of control unit 18. In another example, presence-sensitive display 40 may be an external component of control unit 18 located outside and physically separated from the packaging of control unit 18 (e.g., a monitor, a projector, etc. that shares a wired and/or wireless data path with a tablet computer).

One or more storage devices 33 within computing device 30 may store information for processing during operation of computing device 30. In some examples, one or more of storage devices 33 are temporary memories, meaning that a primary purpose of the one or more storage devices is not long-term storage. Storage devices 33 on computing device 30 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 33, in some examples, also include one or more computer-readable storage media. Storage devices 33 may be configured to store larger amounts of information than volatile memory. Storage devices 33 may further be configured for long-term storage of information as non-volatile memory space and retain information after activate/off cycles. Examples of non-volatile memories include magnetic hard discs, optical discs, flash memories, or forms of electrically programmable memories (EPROM) or electrically erasable and programmable (EEPROM) memories. Storage devices 33 may store program instructions and/or data associated with operator stress module 24, UI module 26, application modules 28, and operating system 46.

Operating system 46, in some examples, controls the operation of components of computing device 30. For example, operating system 46, in one example, facilitates the communication of operator stress module 24, UI module 26, and application modules 28 with processors 32, storage devices 33, input components 34, output components 36, communication units 38, presence-sensitive display 40.

Attention management module 24 may include functionality to manage an attention level of an operator of vehicle 2 that the operator directs towards a task of driving vehicle 2 by pacing content browsing on computing device 30. As shown in the example of FIG. 2, attention management module 24 may include vehicle state detection module 47, input detection module 52, and buffer rate module 54. Attention management module 24 may also maintain attention buffer 50.

For example, input detection module 52 of attention management module 24 may be configured to receive indications of user inputs received by one or more of input components 34, 44 and pace the operator's content interaction by controlling based on the received user inputs whether input components 34, 44 are operable by the operator. The user inputs may include, for example, tactile, audio, or video inputs such as touch inputs, voice commands, and/or non-touch gesture commands provided by a user. For example, input detection module 52 may receive indications of user inputs from presence-sensitive input component 44, in addition or alternative to receiving indications of user inputs such as voice commands detected by a microphone or non-touch gesture commands detected by a video camera. In some examples, input detection module 52 receives indications of inputs from one or more various input components having different input modalities, such as different tactile input modalities (e.g., touch screen, touch pads, steering wheel controls (e.g., buttons, thumb pads), rotary knobs with translation), voice commands, non-touch gesture commands, for example. The input components may include components of both computing device 30, mechanical input components of vehicle 2, or a separate in-vehicle navigation system. In some examples, buffer rate module 54 may apply different buffer depletion rates depending on the input modality. In some examples, input detection module 52 may include a voice command processing component that detects and processes voice command user inputs. In some examples, input detection module 52 may include a gesture command processing component that detects and processes non-touch gesture command user inputs.

Attention buffer 50 may be a data structure or set of data structures. In some examples, Attention buffer 50 may be locally stored on computing device 30 by attention management module 48. In some examples, attention buffer 50 may be stored at a remote site (e.g., a server device physically separate from computing device 30). Attention management module 24 may also store various configurable threshold values for user with attention buffer 50. For example, attention management module 48 may store a threshold value for attention buffer 50 that when reached, causes attention management module 48 to block further interaction with the user interface. In some cases, this threshold value may be a value indicating that attention buffer 50 is empty. As another example, attention management module 48 may store a threshold value for attention buffer 50 that when reached, causes attention management module 48 to allow interaction with the user interface. In some cases, this threshold value may be a value indicating that attention buffer 50 is full. In some examples, attention management module 48 may store data associating rates for decreasing or increasing attention buffer as a function of number of user inputs, frequency of user inputs, and/or other factors, as described in further detail herein.

Input detection module 52 may detect a frequency of user inputs, and may treat a group of successive user inputs having a high frequency as a single user input, such that the buffer model effectively associates the group of successive user inputs with a single expected visual glance. The frequency of user inputs may be an input-to-input frequency (based on an amount of time between user inputs).

For example, buffer rate module 54 of attention management module 48 may be configured to select a rate or amount for decreasing a level of the attention buffer 50 based on the type of user input made. This may be because different types of user inputs have different expected visual glance behavior associated with them. In response to input detection module 52 detecting a user input, buffer rate module 54 may determine a type of the user input, and select a rate at which to deplete a level of attention buffer 50 based on the determined type of the user input. For example, buffer rate module 54 may reference a data structure storing an association between types of user inputs and corresponding buffer depletion rates or amounts. Example types of user inputs that input detection module 52 may detect include, for example, one or more of voice commands, gesture commands, pad inputs (e.g., via a touchpad, thumbpad, d-pad, etc.), knob inputs, tap inputs, swipe inputs, slow scroll inputs, fast scroll inputs, quick successive taps that are grouped as a single user input, and quick successive swipes that are grouped as a single user input.

As one example, buffer rate module 54 may select a lower buffer depletion rate in response to input detection module 52 determining that received user inputs are a group of quick successive swipes. Quick successive swipes may indicate that the user is swiping to try to get to a destination view and is not looking at the user interface until the swipes slow down after arriving at the bottom. As another example, buffer rate module 54 may select a lower buffer depletion rate in response to input detection module 52 determining that received user inputs are a group of quick successive taps. In some examples, input detection module 52 may detect a user input that invokes a tap-to-scroll function, and may treat this type of user input differently than a simple tap user input, based on how this user input correlates to expected glance behavior. For example, buffer rate module 54 may decrease attention buffer 50 at a lower rate in response to detecting tap-to-scroll user input than in response to detecting a tap input.

As another example, attention management module 48 may be configured to select a rate or amount for decreasing a level of the attention buffer 50 based on what is being displayed to the driver. For example, one or more of an amount of information or a type of information being displayed can be configured to impact a buffer depletion rate selected by attention management module 48. For example, attention management module 48 may determine an information quantity and/or quality metric associated with the information presented to the driver, and buffer rate module may select a buffer depletion rate based on the information quantity and/or quality metric. This may reflect that the display format, amount of information, or type of information may each relate to the complexity of the secondary task being performed by the user and affect how much attention is being devoted to the secondary task instead of the driving task. That is, the more dense the information presented to the user, the longer the expected visual glance behavior is expected to be for the user to review the information.

As a further example, attention management module 48 may be configured to select a rate or amount for decreasing a level of the attention buffer based on received information regarding driving state of vehicle 2. Driving state may include, for example whether vehicle 2 is parked/driving, a speed of vehicle 2, and environmental conditions that may impact driving such as weather or traffic. For example, vehicle state detection module 47 may detect a driving state of vehicle 2. Driving state may include a speed at which vehicle 2 is moving (including whether vehicle 2 is moving or stationary), a gear that vehicle 2 is in (e.g., whether vehicle 2 is in a "park" or a "drive" gear). Vehicle state detection module 47 can detect the driving state of vehicle 2 based on, for example, one or more of indications of driving state received from sensors of computing device 30, indications of driving state received from a vehicle computing device integrated within vehicle 2, indications of driving state received from other applications 28, and indications of driving state received from sensors associated with components of vehicle 2.

Vehicle state detection module 47 may provide real-time information about the driving state of vehicle 2 to buffer rate module 54. Buffer rate module 54 may alternatively or additionally base selection of a rate at which to deplete attention buffer 50 based on the information about the driving state of vehicle 2 from vehicle state detection module 47, in some examples. For example, in response to input detection module 52 detecting a user input, buffer rate module 54 may select a rate at which to deplete attention buffer based on at least a type of the user input and a detected state of vehicle 2 (e.g., a speed at which vehicle 2 is moving). In another example, in response to input detection module 52 detecting a user input, buffer rate module 54 may select a rate at which to deplete attention buffer based on at least a rate of user inputs and a detected state of vehicle 2 (e.g., a speed at which vehicle 2 is moving, or a safety system of vehicle 2 in a warning state, such as a lane departure warning).

In another example, in response to input detection module 52 detecting a user input, buffer rate module 54 may alternatively or additionally select the rate based in part on information regarding driving conditions (e.g., deplete more quickly in inclement weather, deplete more slowly in calm weather). In some examples, buffer rate module 54 may select the rate based in part on information regarding an amount of attention that is needed to navigate a particular geographic area. For example, buffer rate module 54 may select a higher rate in response to determining the vehicle 2 is in a geographic area designated as "urban" and a lower rate in response to determining the vehicle 2 is in a geographic area designated as "rural." As another example, buffer rate module 54 may select a higher rate in response to determining the vehicle 2 is navigating a complex intersection, or a roadway under construction. In general, buffer rate module 54 may associate a higher rate of attention buffer depletion with driving state expected to require more attention to the driving task. In some examples, vehicle state detection module 47 may obtain the information regarding driving conditions from one or more other application modules 28, for example from a weather application, a traffic application, and/or a maps application. In some examples, vehicle state detection module 47 may obtain information regarding driving conditions from sensors of computing device 30. Vehicle state detection module 47 may determine that vehicle 2 is within a map area indicated as dangerous, difficult, or hazardous, e.g., based on communication with a maps application.

In some examples, buffer rate module 54 may determine a level of risk associated with a driver based on assessing one or more risk factors, e.g., demographic factors, detected driver behavior, and whether the driver engages with the user interface during driving situations that are expected to require more attention to the driving task. If demographic information may be used to determine a level of risk, it may be based on aggregated demographic information for groups of users. Buffer rate module 54 may correlate data received from input detection module 52 and data received from vehicle state detection module 47, e.g., based on time stamps, and may modify a rate of depleting attention buffer 50 based on determining a driver often engages with the user interface during driving situations that are expected to require more attention to the driving task. Buffer rate module 54 may determine driver behavior based on, for example, one or more of accelerometer data, detected hard braking, frequent braking, swerving, driving in excess of a speed limit, and number or frequency of speed bump occurrences. In some examples, buffer rate module 54 may employ an adaptive model and/or machine learning techniques to evaluate a driver's user interface interactions and driving behavior, assess driver risk, and modify an attention buffer depletion rate based on determined driver risk.

In some examples, buffer rate module 54 may not deplete attention buffer unless vehicle state detection module 47 indicates that vehicle 2 is moving. In some examples, buffer rate module 54 may not deplete attention buffer if vehicle state detection module 47 indicates that vehicle 2 is in a "Park" mode. In some examples, rather than buffer rate module 54 refraining from depleting the attention buffer, instead buffer rate module 54 may continue to deplete attention buffer 50 but may modify one or more buffer thresholds while vehicle state detection module 47 indicates that vehicle 2 is in a "Park" mode or vehicle 2 is not moving. These approaches may avoid unnecessary pacing of the vehicle operator if the operator is not actually driving while interacting with computing device 30.

In some examples, attention management module 48 may detect a source location in the vehicle at which the user inputs are received (being input by a user), and may adjust attention buffer 50 only in response to determining the user inputs are detected at an input component accessible to the vehicle operator. If attention management module 48 determines the user inputs are coming from a different source location within the car, such as a passenger seat or rear seat entertainment console interface, attention management module 48 may not adjust attention buffer 50 in response to detecting these user inputs, but instead disregards these user inputs for purposes of determining a rate of buffer depletion. As one example, attention management module 48 may output for display a query of "Are you a passenger?" and not adjust attention buffer 50 as described herein to pace content interaction if a "yes" response is received.

In response to determining that attention buffer 50 is empty or a level of attention buffer 50 has increased below a predefined threshold, attention management module 48 may block interaction with a user interface of computing device 30. For example, attention management module 48 may output an indication that interaction with the user interface is suspended. The indication may cause UI module 26 to provide a notification, such as via one of output components 36 and/or display component 42. The notification may be one or more of audible, tactile, and visual, for example. The indication may cause UI module 26 to change a presentation of the user interface such that the user cannot continue interacting with the user interface while the presentation is changed. For example, UI module 26 may cause display component 42 to change how information is displayed by display component 42. For example, display component 42 may make one or more user interface elements (such as a menu structure) semi-transparent or greyed-out. Display component 42 may use these or other display changes to indicate that the user interface elements are non-functional, and may not change the user interface elements in response to input detection module 52 detecting further inputs during the blocking period.

Attention management module 48 may cause output of one or more notifications based on the state of attention buffer 50. In some examples, UI module 26 may cause display component 42 to overlay a notification. For example, display component 42 may display a notification such as message of "For safety, browsing is paused for X seconds," where X may be a configurable value. In some examples, display component 42 may output a visual representation such as a countdown timer or a clock showing how much time is left until user interaction is allowed. In some examples, output component 36 may output an audible notification indicating an amount of time remaining in the user interface interaction blocking. In some examples, after the buffer level is sufficiently high, attention management module 48 may cause output component 36 to output an audible notification indicating interaction is again allowed. In some examples, attention management module 48 may cause output component 36 to display an educational component as the user is depleting attention buffer 50. For example, attention management module 48 may cause output component 36 to communicate the state of attention buffer 50 in real-time (e.g., visually or audibly), to encourage the user to proactively interact with the user interface at a reasonable rate to avoid emptying attention buffer 50. In some examples, attention management module 48 may simply output a notification (e.g., a self-expiring "toast" notification), e.g., requesting the user to pause interaction, without actually blocking interaction with the user interface.

Attention management module 48 may refill attention buffer 50 if no user inputs are detected for a predefined time period. Attention management module 48 may use various buffer refill rates. In some examples, Attention management module 48 may use different buffer refill rates depending on factors, such as amount or type of information being displayed to the user, driving state, and other factors.

Attention management module 48 may allow interaction with the user interface after determining attention buffer 50 is a predefined percent of full. For example, attention management module 48 may, in response to determining that a level of the attention buffer has increased from below the second threshold to above the second threshold, output an indication that interaction with the user interface is no longer suspended. The indication may cause UI module 26 to provide a notification, such as via one of output components 36. The notification may be one or more of audible, tactile, and visual, for example.

Figure 3:
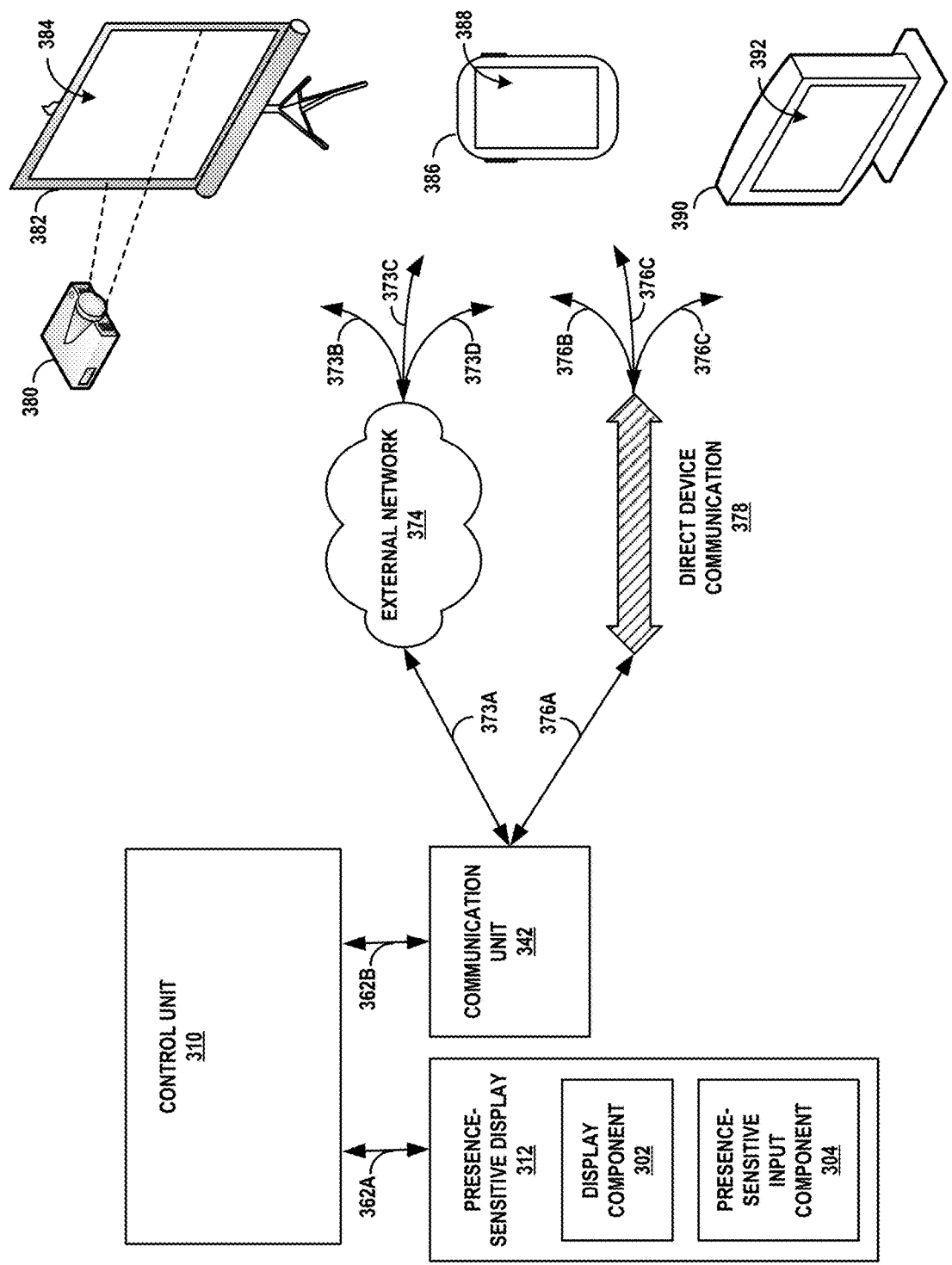
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, or a group of moving images, to name only a few examples. The example shown in FIG. 3 includes a computing device 310, a PSD 312, communication unit 342, projector 380, projector screen 382, mobile device 386, and visual display component 390. In some examples, PSD 312 may be a presence-sensitive display as described in FIGS. 1-2. Although shown for purposes of example in FIGS. 1 and 2 as a stand-alone control unit 18, a computing device such as control unit 310 may, generally, be any component or system that includes a processor or other suitable computing environment for executing software instructions and, for example, need not include a presence-sensitive display.

As shown in the example of FIG. 3, control unit 310 may be a processor that includes functionality as described with respect to processors 240 in FIG. 2. In such examples, control unit 310 may be operatively coupled to PSD 312 by a communication channel 362A, which may be a system bus or other suitable connection. Control unit 310 may also be operatively coupled to communication unit 342, further described below, by a communication channel 362B, which may also be a system bus or other suitable connection. Although shown separately as an example in FIG. 3, control unit 310 may be operatively coupled to PSD 312 and communication unit 342 by any number of one or more communication channels.

In other examples, such as illustrated previously by computing device 110 in FIGS. 1A-1E or computing device 210 in FIG. 2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from control unit 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to control unit 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, control unit 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Control unit 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, heads-up display, head-mounted display, and any other suitable devices for displaying graphical content. Projector 380 and projector screen 382 may include one or more communication units that enable the respective devices to communicate with control unit 310. In some examples, the one or more communication units may enable communication between projector 380 and projector screen 382. Projector 380 may receive data from control unit 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to control unit 310. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 484. Presence-sensitive display 384 may include a subset of functionality or all of the functionality of presence-sensitive display 40 and/or 312 as described in this disclosure. In some examples, presence-sensitive display 384 may include additional functionality. Projector screen 382 (e.g., an electronic whiteboard, heads-up display screen, or other type of screen), may receive data from control unit 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to control unit 310. In some examples, control unit 310 may correspond to control unit 18 of FIG. 2.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from control unit 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 16, 40, and/or 312 as described in this disclosure. In some examples, presence-sensitive displays 388, 392 may include additional functionality. In any case, presence-sensitive display 392, for example, may receive data from control unit 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to control unit 310.

As described above, in some examples, control unit 310 may output graphical content for display at PSD 312 that is coupled to control unit 310 by a system bus or other suitable communication channel. Control unit 310 may also output graphical content for display at one or more remote devices, such as projector 380, projector screen 382, mobile device 386, and visual display component 390. For instance, control unit 310 may execute one or more instructions to generate and/or modify graphical content in accordance with techniques of the present disclosure. Control unit 310 may output the data that includes the graphical content to a communication unit of control unit 310, such as communication unit 342. Communication unit 342 may send the data to one or more of the remote devices, such as projector 380, projector screen 382, mobile device 386, and/or visual display component 390. In this way, control unit 310 may output the graphical content for display at one or more of the remote devices. In some examples, one or more of the remote devices may output the graphical content at a presence-sensitive display that is included in and/or operatively coupled to the respective remote devices.

In some examples, control unit 310 may not output graphical content at PSD 312 that is operatively coupled to control unit 310. In other examples, control unit 310 may output graphical content for display at both a PSD 312 that is coupled to control unit 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by control unit 310 and output for display at PSD 312 may be different than graphical content display output for display at one or more remote devices.

Control unit 310 may send and receive data using any suitable communication techniques. For example, control unit 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between control unit 310 and the remote devices illustrated in FIG. 3. In some examples, network links 373A-373D may be Ethernet, ATM or other network connections. Such connections may be wireless and/or wired connections.

In some examples, control unit 310 may be operatively coupled to one or more of the remote devices included in FIG. 3 using direct device communication 378. Direct device communication 378 may include communications through which control unit 310 sends and receives data directly with a remote device, using wired or wireless communication. That is, in some examples of direct device communication 378, data sent by control unit 310 may not be forwarded by one or more additional devices before being received at the remote device, and vice-versa. Examples of direct device communication 378 may include Bluetooth, Near-Field Communication, Universal Serial Bus, Wi-Fi, infrared, etc. One or more of the remote devices illustrated in FIG. 3 may be operatively coupled with control unit 310 by communication links 376A-376D. In some examples, communication links 376A-376D may be connections using Bluetooth, Near-Field Communication, Universal Serial Bus, infrared, etc. Such connections may be wireless and/or wired connections.

Control unit 310 may be operatively coupled to visual display component 390 using external network 374. Control unit 310 may output a graphical user interface for display at PSD 312. For instance, control unit 310 may send data that includes a representation of the graphical user interface to communication unit 342. Communication unit 342 may send the data that includes the representation of the graphical user interface to visual display component 390 using external network 374. Visual display component 390, in response to receiving the data using external network 374, may cause PSD 392 to output the graphical user interface. In response to receiving a user input at PSD 392 to select one or more buttons of the graphical user interface, visual display component 390 may send an indication of the user input to control unit 310 using external network 374. Communication unit 342 of may receive the indication of the user input, and send the indication to control unit 310.

In some examples, PSD 312 may be part of an infotainment unit of a vehicle, such as vehicle 2, and control unit 310 may be one or more processors of a mobile computing device. For example, control unit 310 may have an attention management module such as attention management module 48 of FIG. 2, which may perform one or more actions as described herein based on indications of user inputs that control unit 310 receives from PSD 312 of the vehicle infotainment unit, where presence-sensitive input component 304 of presence-sensitive display 312 detects the user inputs. Control unit 310 of the mobile computing device may output for display by display component 302 of the infotainment unit a notification that further interaction with presence-sensitive display 312 is blocked, in response to the attention management module determining that the attention buffer has been depleted based on the user inputs.

Figure 4:
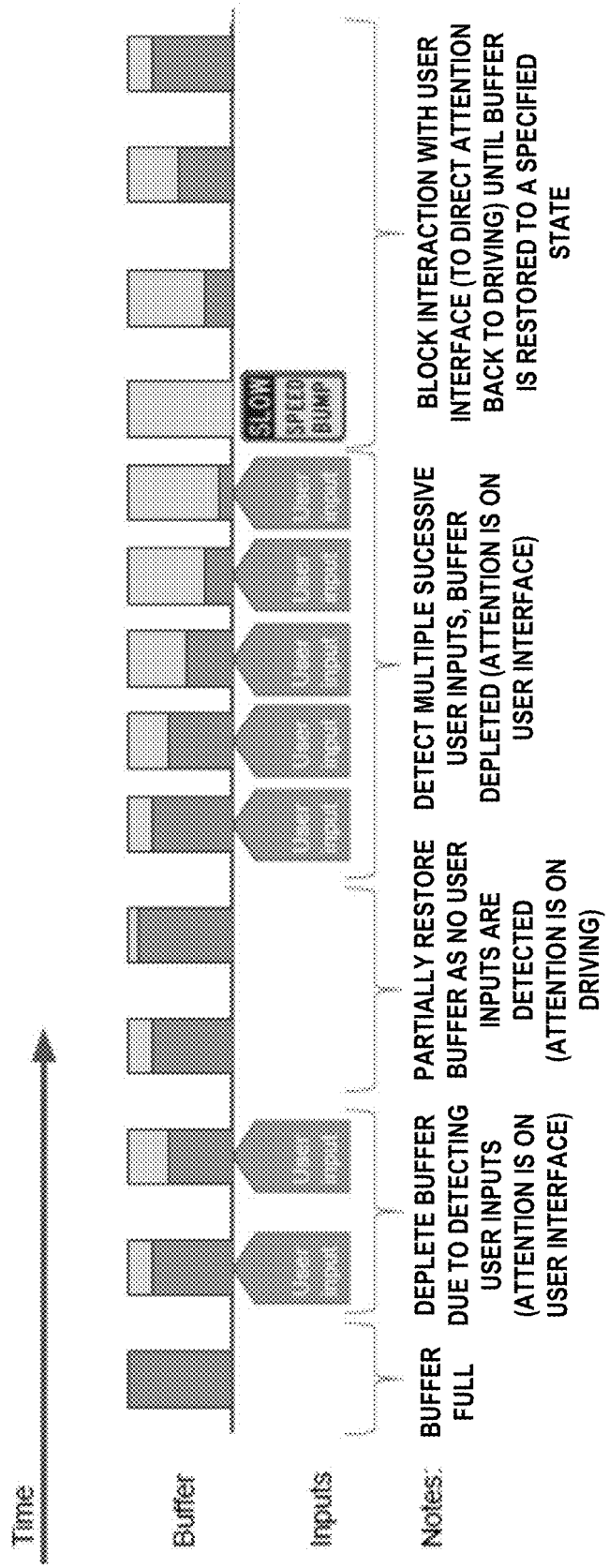
FIG. 4 is a block diagram illustrating example operation of an example attention model in blocking interaction with a user interface.

FIG. 4 is a block diagram illustrating example operation of an example attention model in blocking interaction with a user interface. The example attention model shows effect of user inputs on attention buffer 50 over time. Buffer levels in FIG. 4 are shown for purposes of example, and are not necessarily to scale. The user inputs may be received by presence-sensitive display 30 of computing device 30.

At a first time, attention buffer 50 is full. In response to receiving first and second user inputs, input detection module 52 depletes attention buffer 50 due to the user inputs, reflecting that the user's attention is on the interface of computing device 30 rather than the driving activity. When input detection module 52 determines that no user inputs have been received for some time period, indicating that the user's attention is on the driving activity, input detection module 52 partially restores credits to attention buffer 50, e.g., at a defined rate.

In response to input detection module 52 detecting multiple successive inputs during a time period (e.g., 5 inputs), indicating that an excessive amount of attention is on the interface rather than the driving task, input detection module 52 successively decreases the level of attention buffer 50 until attention buffer 50 is depleted (has a value/level of zero). In response to attention management module 48 (e.g., more specifically, input detection module 52) determining that attention buffer 50 has dropped below a predefined threshold level (e.g., zero credits), attention management module 48 may output for display a notification or otherwise block the operator from interacting with a user interface of computing device 30, such as presence-sensitive display 40. This may serve to direct the user's attention back to driving, until the buffer is restored to a specified state.

Figure 5:
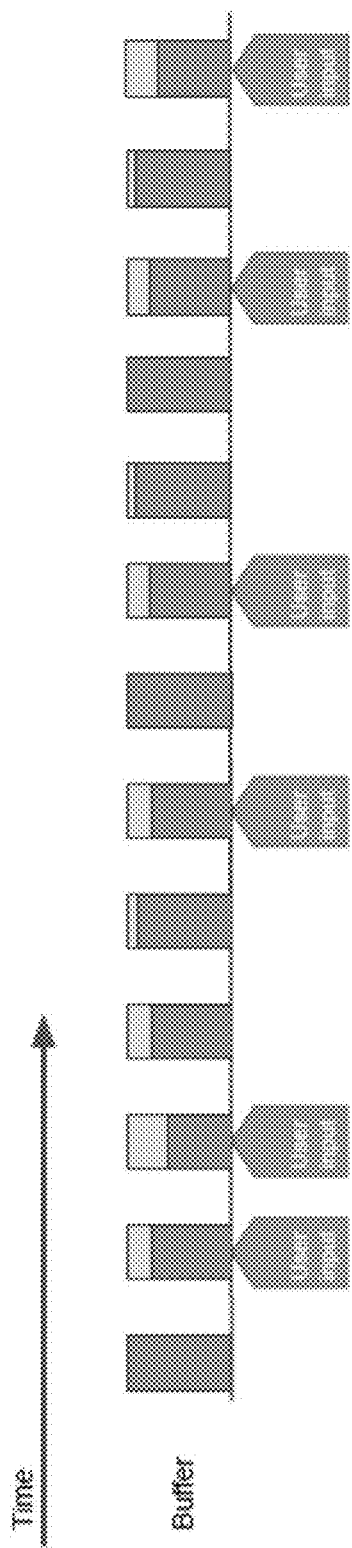
FIG. 5 is a block diagram illustrating an example attention model in pacing content interaction with the user interface.

FIG. 5 is a block diagram illustrating an example attention model in pacing content interaction with the user interface. Buffer levels in FIG. 5 are shown for purposes of example, and are not necessarily to scale. In the example of FIG. 5, attention management module 48 detects user inputs infrequently enough to avoid depleting the attention buffer 50, and attention management module 48 does not block interaction with the user interface or output a notification.

In some examples, attention buffer module 48 reduces the buffer by a set amount in response to every detected user input. Time elapsing between taps causes attention buffer module 48 reduces the buffer by a set amount to build up the buffer. Thus, if a user interacts at an expedited pace, then the user may encounter blocking or preventing further interaction with the user interface. But if a user interacts at a more responsible pace, then more user inputs are available and the blocking is not seen as frequently. Although FIGS. 4 and 5 are described for purposes of example in terms of reducing a level of an attention buffer as user inputs are detected and increasing the level of the attention buffer as user inputs are not detected, in other examples different models may be used. For example, an "interaction intensity" attention buffer model may be used, and attention buffer module 48 may increase a level of the interaction intensity attention buffer as user inputs are detected. When the interaction intensity attention buffer exceeds a first threshold, interaction may be blocked or attention buffer module 48 may trigger notifications to discourage interaction until the interaction intensity attention buffer is below a second threshold.

Figure 6:
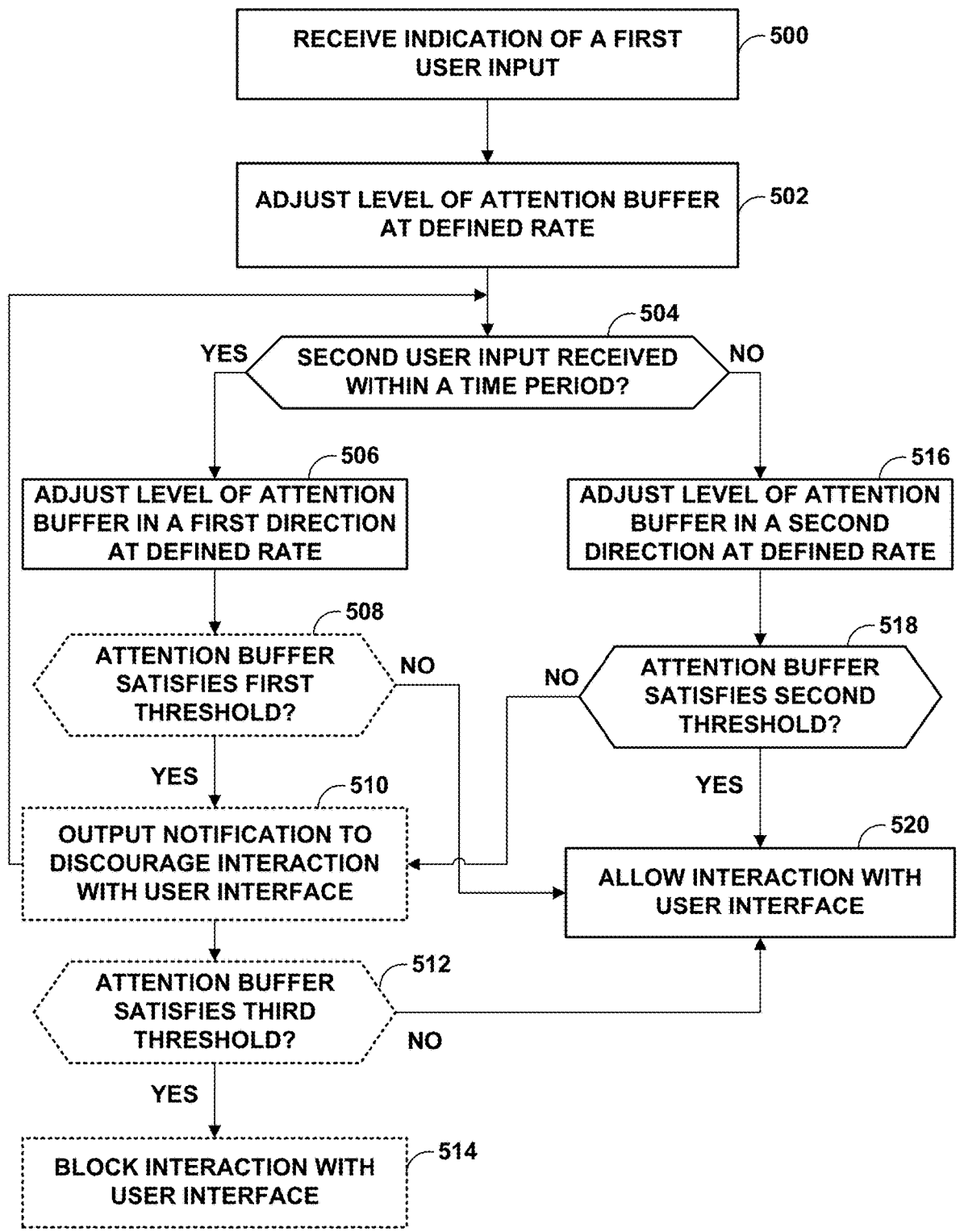
FIG. 6 is a flow diagram illustrating example operation of a computing device to pace content interaction by a vehicle operator, in accordance with one or more techniques of the present disclosure.

FIG. 6 is a flow diagram illustrating example operation of a computing device to pace content interaction by a vehicle operator, in accordance with one or more techniques of the present disclosure. The techniques of FIG. 6 may be performed by one or more processors of a computing system, such as vehicle computing system 4 illustrated in FIG. 1, computing device 30 of FIG. 2, and control unit 310 of FIG. 3. For purposes of illustration, the techniques of FIG. 6 are described within the context of vehicle computing device 4 of FIG. 1 and computing device 30 of FIG. 2, although computing systems having configurations different than that of vehicle computing system 4 may perform the techniques of FIG. 6.

A vehicle, such as vehicle 2 of FIG. 1, which includes vehicle computing system 4 may be used for a variety of activities, such as commuting, running errands, etc. While the vehicle is being used, vehicle computing system 4 may receive, by one or more processors of vehicle computing system 4, an indication of a first user input (500). For example, the first user input may be, for example, any of a tap input, a swipe input, a slow scroll input, a fast scroll input, a voice command, and a non-touch gesture command. For example, input detection module 52 of attention management module 48 may detect the first user input, such as by receiving an indication of the first user input from presence-sensitive input component 44 by which the user made the user input. For example, receiving the indication of the user input may include receiving the indication from a computing device such as a mobile computing device of the operator. For example, receiving the indication of the user input may include receiving the indication from a vehicle computing system integrated within the vehicle and separate from a computing device having attention management module 48. Responsive to receiving the indication of the first user input, the one or more processors adjusts a level of an attention buffer at a defined rate (502). For example, buffer rate module 54 may determine a rate at which to adjust the level of attention buffer 50 based on one or more of a type of the user input, a frequency of user inputs (e.g., based on the user input and earlier user input(s)), a type of information displayed in response to the user input, and amount of information displayed in response to the user input, a format of information displayed in response to the user input, or information regarding vehicle state. The information regarding vehicle state may be obtained by vehicle state detection module 47, as described above. Attention management module 48 may adjust the level of attention buffer 50 by reducing or increasing the level of attention buffer 50, depending on whether attention buffer 50 reflects an amount of available attention or interaction intensity in the attention model.

Responsive to determining that the level of the attention buffer satisfies a first threshold (YES branch of 508), attention management module 48 outputs a notification to discourage interaction with a user interface of vehicle computing system 4 (510). If the level of the attention buffer does not satisfy the first threshold (NO branch of 508), attention management module 48 allows interaction with the user interface (520). Responsive to determining that the level of the attention buffer satisfies a third threshold (YES branch of 512), the one or more processors blocks interaction with a user interface of vehicle computing system 4 (514). The first threshold may be a configurable value stored by storage devices 33 and accessed by attention management module 48. For example, attention management module 48 may freeze a display and/or darken the display and make no changes to the display in response to receiving indication of detecting subsequent user inputs. In some examples, attention management module 48 may output a notification indicating interaction with the user interface has become excessive, or is blocked (paused), such as a tactile notification, audible notification, or display notification (e.g., display a message, graphic, or by changing the look of the user interface). In some examples, attention management module 48 may provide an indication of an amount of time remaining in the blocked state.

Responsive to input detection module 52 determining that an indication of a second user input has not been received within a time period (NO branch of 504), attention management module 48 adjusts, by the one or more processors, a level of the attention buffer in a first direction (516). If input detection module 52 determines that an indication of a second user input is received within the time period (YES branch of 504), attention management module 48 may adjust the level of the attention buffer in a second direction at a defined rate in response (506). For example, attention management module 48 may increase the level of the attention buffer if no indication of a second user input is detected, or may decrease the level of the attention buffer if a second user input is detected. The second user input may be a different type of user input than the first user input. Responsive to determining, by the one or more processors, that the level of the attention buffer satisfies second threshold (YES branch of 518) (e.g., is above a second threshold), attention management module 48 allows interaction with the user interface (520). The second threshold may be a different value than the first threshold, e.g., a higher value. For example, determining the attention buffer satisfies the first threshold may include determining the attention buffer is empty. Determining the attention buffer satisfies the second threshold may include determining that the attention buffer is full, for example. In some examples, responsive to determining the attention buffer satisfies the second threshold, attention management module 48 may output an indication that interaction with the user interface may resume, such as an auditory cue.

If the level of the attention buffer does not satisfy the second threshold (NO branch of 518), attention management module 48 may output a notification to discourage interaction with the user interface (510) and may eventually block interaction with the user interface (514). Attention management module 48 may output for display a notification regarding the blocked interaction. In some examples, attention management module 48 may output notifications to discourage interaction with the user interface (e.g., increasing in prominence as successive thresholds are met), without ever actually blocking interaction with the user interface. In other examples, attention management module 48 may not output notifications to discourage interaction with the user interface, but may proceed directly to blocking interaction with the user interface. Steps 508, 510, 512, and 514 are therefore shown in dashed lines to indicate that one or more of these steps may be optional in some examples.

Figure 7:
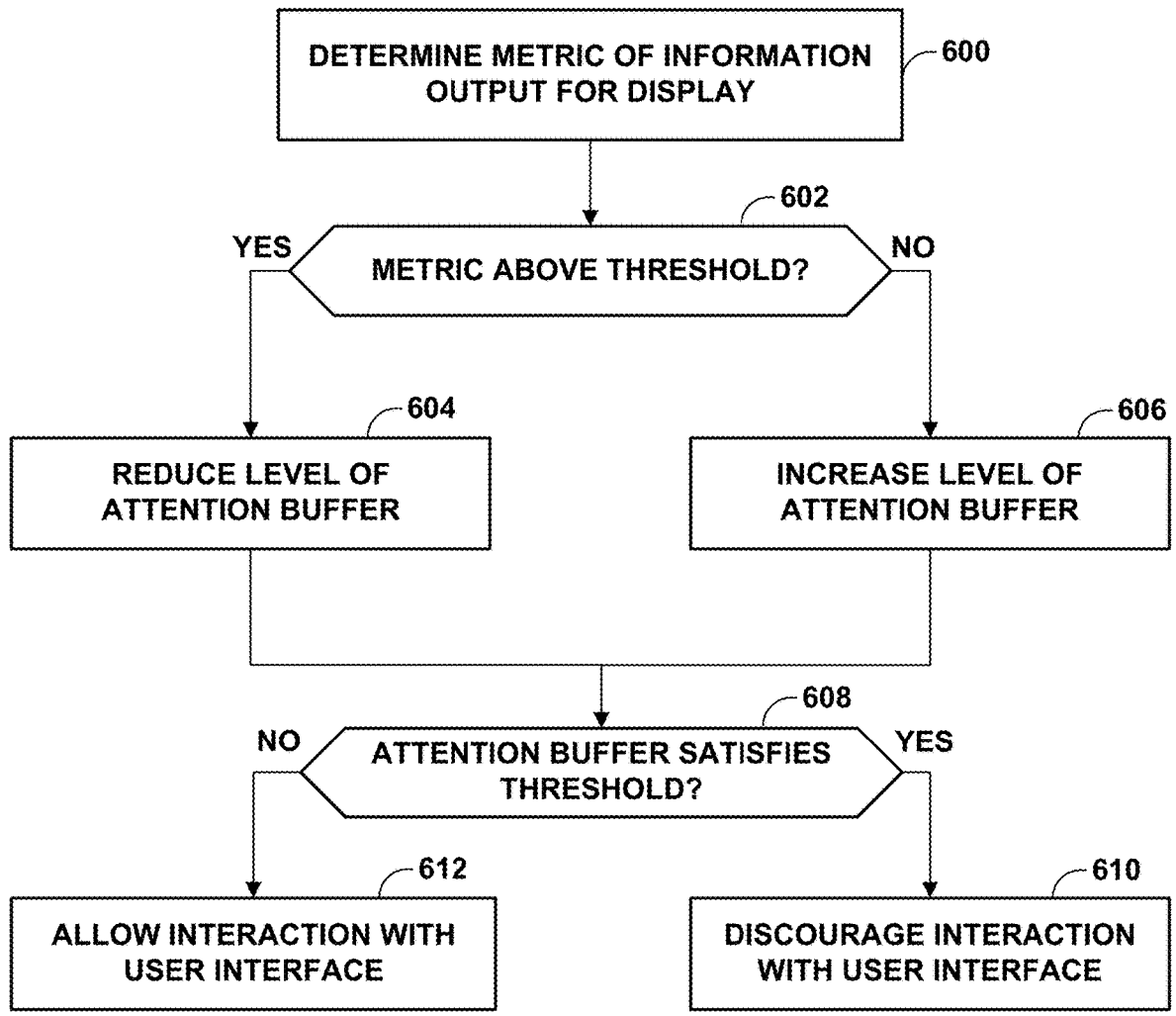
FIG. 7 is a flow diagram illustrating another example operation of a computing device to pace content interaction by a vehicle operator, in accordance with one or more techniques of the present disclosure.

FIG. 7 is a flow diagram illustrating another example operation of a computing device to pace content interaction by a vehicle operator, in accordance with one or more techniques of the present disclosure. The techniques of FIG. 7 may be performed by one or more processors of a computing system, such as vehicle computing system 4 illustrated in FIG. 1, computing device 30 of FIG. 2, and control unit 310 of FIG. 3. For purposes of illustration, the techniques of FIG. 7 are described within the context of vehicle computing device 4 of FIG. 1 and computing device 30 of FIG. 2, although computing systems having configurations different than that of vehicle computing system 4 may perform the techniques of FIG. 7.

One or more processors of a computing device included in a vehicle may determine a metric of information output for display by the computing device (600). For example, attention management module 48 may determine one or more of an amount of information output for display, a rate of information output for display (e.g., number of user inputs per unit time), a type of information displayed (e.g., text, icons, pictures), number of information items displayed (e.g., number of icons displayed at one time), quantity of information displayed, quality of information displayed, and a format of information output for display. Attention management module 48 may determine the metric of information output for display before or after the information is displayed. In some examples, the information is output for display by vehicle computing system 4 or computing device 30 in response to receiving an indication of one or more user inputs, such as any user inputs described herein.

Responsive to determining that the metric of information output for display is above a threshold metric (YES branch of 602), the one or more processors, reduces a level of an attention buffer stored by the computing device (604). For example, attention management module 48 may store the threshold metric value, which may be configurable. Attention management module 48 may determine that the metric of information output for display (e.g., rate of information) is above the threshold. Buffer rate module 54 of attention management module 48 may, in some examples, select a rate at which to decrease the level of attention buffer 50 based on a type of the metric of information, where the types may be any of the types of metric mentioned above. In some examples, buffer rate module 54 may additionally or alternatively select the rate based on driving state, as described herein. In some examples, buffer rate module 54 may additionally or alternatively select the rate based on a type of the user input that prompted the display of information, as described herein. Responsive to determining that the metric of information output for display is not above the threshold rate (NO branch of 602), the one or more processors increases a level of the attention buffer (606).

Responsive to determining that the level of the attention buffer has fallen below a threshold (e.g., a first attention buffer threshold) (608), the one or more processors (e.g., attention management module 48) outputs one or more notifications to discourage interaction with the user interface (610). In some examples, the one or more processors outputs one or more notifications indicating that too much interaction is occurring, without blocking interaction with the user interface. In some examples, attention management module 48 outputs an indication that interaction with a user interface is suspended, as described herein. Responsive to determining, by the one or more processors, that the level of the attention buffer satisfies the threshold (e.g., is above a different, second attention buffer threshold) (NO branch of 608), the one or more processors allows interaction with the user interface (612). In some examples, the first attention buffer threshold and the second attention buffer threshold are the same threshold value. In other examples, the first attention buffer threshold is lower than the second attention buffer threshold. For example, the first attention buffer threshold may correspond to attention buffer 50 being "empty" and the second attention buffer threshold may correspond to attention buffer 50 being "full." Computing device 30 may continue to pass through the states of FIG. 14, such that after preventing further interaction with the user interface at step 610, attention management module 48 may subsequently allow interaction with the user interface in response to determining that the attention buffer 50 has been restored.

Although FIGS. 4 and 5 are described for purposes of example in terms of reducing a level of an attention buffer as user inputs are detected and increasing the level of the attention buffer as user inputs are not detected, in other examples different models may be used. For example, an "interaction intensity" attention buffer model may be used, and attention buffer module 48 may increase a level of the interaction intensity attention buffer as user inputs are detected. When the interaction intensity attention buffer exceeds a first threshold, interaction may be blocked or attention buffer module 48 may trigger notifications to discourage interaction until the interaction intensity attention buffer is below a second threshold.

The following numbered examples may illustrate one or more aspects of the disclosure:

Example 1

A method for pacing content interaction of a vehicle operator, the method comprising: receiving, by one or more processors of a computing device, an indication of a first user input; responsive to receiving the indication of the first user input, adjusting, by the one or more processors, a level of an attention buffer at a defined rate; responsive to determining that the level of the attention buffer satisfies a first threshold, preventing, by the one or more processors, further interaction with a user interface of the computing device; responsive to determining that an indication of a second user input has not been received within a time period, adjusting, by the one or more processors, a level of the attention buffer; and responsive to determining, by the one or more processors, that the level of the attention buffer satisfies a second threshold, allowing further interaction with the user interface.

Example 2

The method of example 1, further comprising: determining a type of the first user input; and selecting, based on the type of the first user input, the defined rate at which to adjust the level of the attention buffer.

Example 3

The method of example 2, wherein the type of the first user input is selected from the group consisting of: a tap input, a swipe input, a scroll input, a pad input, a knob input, a voice command, and a non-touch gesture command.

Example 4

The method of any combination of examples 1-3, further comprising: determining, based on one or more of a format of information displayed, a number of information items displayed, a quantity of information displayed, and a quality of information displayed, an amount of information output for display in response to the first user input; and selecting the defined rate at which to adjust the level of the attention buffer based on one or more of the format of information displayed, number of information items displayed, quantity of information displayed, and quality of information displayed.

Example 5

The method of any combination of examples 1-4, further comprising: in response to determining, by the one or more processors, that the level of the attention buffer satisfies the second threshold, outputting an indication that interaction with the user interface is no longer suspended.

Example 6

The method of any combination of examples 1-5, further comprising: determining whether the vehicle is moving, wherein preventing further interaction with the user interface comprises preventing further interaction responsive to determining that the vehicle is moving.

Example 7

The method of any combination of examples 1-6, wherein receiving the indication of the user input comprises receiving the indication from a presence-sensitive input component.

Example 8

The method of any combination of examples 1-7, further comprising: in response to determining, by the one or more processors, that the level of the attention buffer is above the second threshold, providing an audio cue to indicate that further interaction with the user interface is allowed.

Example 9

A computing device comprising: one or more audio output components; and one or more processors configured to perform the method of any combination of examples 1-8.

Example 10

A computer-readable storage medium storing instructions that, when executed, cause one or more processors of an in-vehicle computing system to perform the method of any combination of examples 1-8.

Example 11

A computing device comprising means for performing the method of any combination of examples 1-8.

Example 12

A method for pacing content browsing of a vehicle operator, the method comprising: determining, by one or more processors of a computing device included in a vehicle, a rate of information output for display by the computing device; responsive to determining that the rate of information output for display satisfies a threshold rate, adjusting, by the one or more processors, a level of an attention buffer stored by the computing device; responsive to determining that the rate of information output for display does not satisfy the threshold rate, adjusting, by the one or more processors, a level of the attention buffer; responsive to determining that the level of the attention buffer satisfies a first attention buffer threshold, outputting, by the one or more processors, an indication that interaction with a user interface is suspended; and responsive to determining, by the one or more processors, that the level of the attention buffer satisfies a second attention buffer threshold, allowing interaction with the user interface.

Example 13

A method for pacing content browsing of a vehicle operator, the method comprising: receiving, by one or more processors of a computing device, an indication of a first user input; responsive to receiving the indication of the first user input, adjusting, by the one or more processors, a level of an attention buffer at a defined rate; responsive to determining that the level of the attention buffer satisfies a first threshold, outputting, by the one or more processors, a first notification to discourage interaction with a user interface of the computing device; responsive to determining that an indication of a second user input has not been received within a time period, adjusting, by the one or more processors, a level of the attention buffer; and responsive to determining, by the one or more processors, that the level of the attention buffer satisfies a second threshold, allowing further interaction with the user interface without outputting a subsequent notification to discourage interaction with the user interface.

Example 14

The method of example 13, further comprising: receiving, by one or more processors of a computing device, an indication of a second user input; responsive to receiving the indication of the second user input, adjusting, by the one or more processors, a level of an attention buffer at a defined rate; responsive to determining that the level of the attention buffer satisfies a third threshold, outputting, by the one or more processors, a second notification to discourage further interaction with a user interface of the computing device, wherein the second notification differs from the first notification.

Example 15

The method of any combination of examples 13 and 14, further comprising: receiving, by one or more processors of a computing device, an indication of a second user input; responsive to receiving the indication of the second user input, adjusting, by the one or more processors, a level of an attention buffer at a defined rate; and responsive to determining that the level of the attention buffer satisfies a third threshold, preventing, by the one or more processors, further interaction with a user interface of the computing device.

Example 16

The method of any combination of examples 13-15, further comprising: responsive to determining, by the one or more processors, that the level of the attention buffer satisfies the second threshold, outputting a notification indicating further interaction with the user interface is allowed.

Example 17

The method of any combination of examples 13-16, further comprising: determining a type of the first user input; and selecting, based on the type of the first user input, the defined rate at which to adjust the level of the attention buffer.

Example 18

The method of example 17, wherein the type of the first user input is selected from the group consisting of: a tap input, a swipe input, a scroll input, a pad input, a knob input, a voice command, and a non-touch gesture command.

Example 20

A computing device comprising: one or more audio output components; and one or more processors configured to perform the method of any combination of examples 13-16.

Example 21

A computer-readable storage medium storing instructions that, when executed, cause one or more processors of an in-vehicle computing system to perform the method of any combination of examples 13-16.

Example 22

A computing device comprising means for performing the method of any combination of examples 13-16.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the invention have been described. These and other examples are within the scope of the following claims.

What is claimed is:

1. A method for pacing content interaction of a vehicle operator, the method comprising:
   receiving, by one or more processors of a computing device, an indication of a first user input;
   determining, by the one or more processors, a level of risk associated with the vehicle operator,
   selecting, by the one or more processors and based on the level of risk associated with the vehicle operator, a defined rate for adjusting a level of an attention buffer;
   responsive to receiving the indication of the first user input, adjusting, by the one or more processors, the level of the attention buffer at the defined rate;
   responsive to determining that the level of the attention buffer satisfies a first threshold, preventing, by the one or more processors, further interaction with a user interface of the computing device;
   responsive to determining that an indication of a second user input has not been received within a time period, adjusting, by the one or more processors, a level of the attention buffer; and
   responsive to determining, by the one or more processors, that the level of the attention buffer satisfies a second threshold, allowing further interaction with the user interface.

2. The method of claim 1, wherein determining the level of risk associated with the vehicle operator comprises:
   detecting driver behavior; and
   determining the level of risk based on assessing the detected driver behavior.

3. The method of claim 2, wherein detecting driver behavior comprises detecting the driver behavior based on accelerometer data.

4. The method of claim 2, wherein detecting driver behavior comprises detecting driving in excess of a speed limit.

5. The method of claim 2, wherein detecting driver behavior comprises detecting hard braking, detecting frequent braking, and detecting swerving.

6. The method of claim 1, wherein determining the level of risk associated with the vehicle operator comprises:
   determining a driving state of a vehicle operated by the vehicle operator; and
   determining whether the vehicle operator engages with the user interface when the driving state is a driving state expected to require more attention to a driving task.

7. The method of claim 6, wherein determining the driving state of the vehicle comprises determining one or more environmental conditions that may impact driving.

8. The method of claim 7, wherein the one or more environmental conditions comprise one or more of weather, traffic, or type of geographic area.

9. The method of claim 6, wherein determining the driving state of the vehicle comprises determining a speed of the vehicle.

10. The method of claim 6, wherein determining the driving state of the vehicle comprises determining the driving state of the vehicle based on one or more of indications of driving state received from sensors of the computing device, indications of driving state received from a vehicle computing device integrated within the vehicle, indications of driving state received from other applications, and indications of driving state received from sensors associated with components of the vehicle.

11. The method of claim 6, wherein determining the driving state of the vehicle comprises determining the driving state of the vehicle based on indications of driving state received from one or more of a maps application and a weather application.

12. The method of claim 1, further comprising:
   determining, based on one or more of a format of information displayed, a number of information items displayed, a quantity of information displayed, and a quality of information displayed, an amount of information output for display in response to the first user input; and
   wherein selecting the defined rate for adjusting the level of the attention buffer further comprises selecting the defined rate at which to adjust the level of the attention buffer based on the amount of information output for display in response to the first user input.

13. The method of claim 1, further comprising:
in response to determining, by the one or more processors, that the level of the attention buffer satisfies the second threshold, outputting an indication that interaction with the user interface is no longer suspended.

14. A computing device comprising:
one or more user input detection components; and
one or more processors configured to:
receive an indication of a first user input detected by the one or more user input detection components;
determine a level of risk associated with a vehicle operator;
select, based on the level of risk associated with the vehicle operator, a defined rate for adjusting a level of an attention buffer;
responsive to receiving the indication of the first user input, adjust the level of the attention buffer at the defined rate;
responsive to determining that the level of the attention buffer satisfies a first threshold, prevent further interaction with a user interface of the computing device;
responsive to determining that an indication of a second user input has not been received within a time period, adjust a level of the attention buffer; and
responsive to determining that the level of the attention buffer satisfies a second threshold, allow further interaction with the user interface.

15. The computing device of claim 14, wherein determining the level of risk associated with the vehicle operator comprises:
detecting driver behavior; and
determining the level of risk based on assessing the detected driver behavior.

16. The computing device of claim 15, wherein detecting driver behavior comprises detecting the driver behavior based on accelerometer data.

17. The computing device of claim 15, wherein detecting driver behavior comprises detecting driving in excess of a speed limit.

18. The computing device of claim 15, wherein detecting driver behavior comprises detecting hard braking, detecting frequent braking, and detecting swerving.

19. The computing device of claim 14, wherein determining the level of risk associated with the vehicle operator comprises:
determining a driving state of a vehicle operated by the vehicle operator; and
determining whether the vehicle operator engages with the user interface when the driving state is a driving state expected to require more attention to a driving task.

20. A non-transitory computer-readable storage medium storing instructions that, when executed, cause one or more processors of a computing device to:
receive an indication of a first user input detected by one or more user input detection components;
determine a level of risk associated with a vehicle operator;
select, based on the level of risk associated with the vehicle operator, a defined rate for adjusting a level of an attention buffer;
responsive to receiving the indication of the first user input, adjust the level of the attention buffer at the defined rate;
responsive to determining that the level of the attention buffer satisfies a first threshold, prevent further interaction with a user interface of the computing device;
responsive to determining that an indication of a second user input has not been received within a time period, adjust a level of the attention buffer; and
responsive to determining that the level of the attention buffer satisfies a second threshold, allow further interaction with the user interface.

* * * * *